(12) United States Patent
Hwang et al.

(10) Patent No.: US 11,495,035 B2
(45) Date of Patent: Nov. 8, 2022

(54) IMAGE CONTEXT PROCESSING

(71) Applicant: LG ELECTRONICS INC., Seoul (KR)

(72) Inventors: Hyunjin Hwang, Seoul (KR); Changhee Han, Seoul (KR); Kyudae Bahn, Seoul (KR); Sanghoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/018,548

(22) Filed: Sep. 11, 2020

(65) Prior Publication Data

US 2021/0209394 A1 Jul. 8, 2021

(30) Foreign Application Priority Data

Jan. 3, 2020 (KR) .................. 10-2020-0000944

(51) Int. Cl.
*G06V 20/62* (2022.01)
*G06V 20/00* (2022.01)
*G06V 30/148* (2022.01)
*G06V 10/20* (2022.01)

(52) U.S. Cl.
CPC ............ *G06V 20/62* (2022.01); *G06V 10/255* (2022.01); *G06V 20/35* (2022.01); *G06V 30/153* (2022.01)

(58) Field of Classification Search
CPC ...... G06F 21/6254; G06F 9/451; G06F 21/54; G06F 21/84; G06F 2221/033; G06F 21/577; G06F 21/6245; G06V 20/62; G06V 10/255; G06V 20/35; G06V 30/153
See application file for complete search history.

(56) References Cited

U.S. PATENT DOCUMENTS

| | | | |
|---|---|---|---|
| 11,270,268 B2 * | 3/2022 | Ferre ..................... | H04L 51/046 |
| 2002/0037097 A1 * | 3/2002 | Hoyos ..................... | G07F 19/20 382/137 |
| 2009/0235280 A1 * | 9/2009 | Tannier .................. | G06Q 10/00 719/318 |
| 2009/0327891 A1 * | 12/2009 | Holm ..................... | G06V 20/63 715/716 |
| 2011/0289422 A1 * | 11/2011 | Spivack ................ | G06F 16/951 715/739 |
| 2013/0191896 A1 * | 7/2013 | Adderly .................. | H04W 4/80 709/204 |
| 2014/0184471 A1 * | 7/2014 | Martynov ............. | G06F 3/1423 345/1.2 |
| 2016/0065648 A1 * | 3/2016 | Kim ...................... | H04L 51/043 715/748 |

(Continued)

*Primary Examiner* — Ming Y Hon
(74) *Attorney, Agent, or Firm* — Birch, Stewart, Kolasch & Birch, LLP

(57) ABSTRACT

Provided is a notification management method of a mobile terminal including generating a screenshot image, determining a category of the screenshot image based on a text or an image included in the screenshot image, and extracting a text or an image related to the category and generating notification information using the extracted text or image. The user equipment and the AI system of this disclosure may be associated with artificial intelligence modules, drones (unmanned aerial vehicles (UAVs)), robots, augmented reality (AR) devices, virtual reality (VR) devices, and devices related to 5G services.

20 Claims, 21 Drawing Sheets

(56) References Cited

U.S. PATENT DOCUMENTS

| | | | |
|---|---|---|---|
| 2016/0180259 A1* | 6/2016 | Marianko | H04L 65/1069 |
| | | | 705/5 |
| 2016/0267424 A1* | 9/2016 | Singh | G06Q 10/063114 |
| 2017/0277719 A1* | 9/2017 | Shih | G06V 10/40 |
| 2017/0278026 A1* | 9/2017 | Nielsen | G06Q 10/063 |
| 2018/0011908 A1* | 1/2018 | Aggarwal | G06F 16/24575 |
| 2018/0129657 A1* | 5/2018 | Guest | G06F 9/44 |
| 2018/0336226 A1* | 11/2018 | Anorga | G06V 20/70 |
| 2018/0349489 A1* | 12/2018 | Toudji | G06F 40/174 |
| 2019/0188529 A1* | 6/2019 | Liu | G06K 9/6215 |
| 2019/0356399 A1* | 11/2019 | John Wilson | H04B 7/063 |
| 2020/0097097 A1* | 3/2020 | Im | G06F 3/0487 |

* cited by examiner

IMAGE CONTEXT PROCESSING

CROSS REFERENCE TO RELATED APPLICATIONS

This non-provisional application claims the benefit under 35 U.S.C. § 119(a) to Patent Application No. 10-2020-0000944, filed in Republic of Korea on Jan. 3, 2020, the entire contents of which are hereby expressly incorporated by reference into the present application.

FIELD OF THE INVENTION

The present disclosure relates to image context processing.

Related Art

The functions of mobile terminals have been gradually diversified. For example, there are functions of data and voice communication, taking pictures and videos through a camera, recording voice, playing music files through a speaker system, and outputting images or videos to a display. Some mobile terminals additionally execute an electronic game play function or perform a multimedia player function. In particular, recent mobile terminals may also generate a screenshot image by capturing a display screen being output through a display.

Meanwhile, the generated screenshot image may be recorded according to various functions and/or purposes, such as a reminder of a user, transmission to another user, and simply recording according to aesthetics of a display screen. However, since the screenshot image simply generates an image corresponding to one frame being output on a display screen, a plurality of user inputs or operations are required in order to use it for various functions and/or purposes.

SUMMARY OF THE INVENTION

The present disclosure also implements image context processing capable of identifying types of information represented by a screenshot image of a display screen by analyzing context of the screenshot image.

The present disclosure also implements image context processing capable of storing an image or text included in a screenshot image in association with an application corresponding to types of information represented by the screenshot image identified by analyzing context of the screenshot image.

The present disclosure also implements image context processing capable of transferring or outputting a guidance message based on a stored image or time information or location information of text.

In an aspect, a notification management method of a mobile terminal includes: generating a screenshot image; determining a category of the screenshot image based on a text or an image included in the screenshot image; and extracting a text or an image related to the category and generating notification information using the extracted text or image.

In the generating of the screen shot image, the screen shot image may be generated from an image being displayed through a touch screen in response to a user's input.

In the generating of the screen shot image, an image of a display screen displayed in a terminal able to communicate with the mobile terminal may be received in response to a user's input.

The determining of the category may include: extracting features from a text or an image included in the screen shot image; and determining the category of the screen shot image using the extracted features and a learning model.

The category may include a performance ticket, sound source information, or an invitation card.

If the category is a performance ticket, the data may include a keyword, a schedule, a venue (or location), a ticket number, or a reservation number related to the performance ticket, or a representative image of the performance.

If the category is a coupon, the data may include a keyword, a barcode, coupon contents, a valid term, or a place of usage related to the coupon.

If the category is sound source information, the data includes a keyword, a title of a sound source, or a name of a singer related to the sound source.

If the category is the invitation card, the data includes a keyword, event contents, a schedule, a location, or an invitation image related to the invitation card.

The generating of the notification information may include: displaying a message for generating the notification information; and generating the notification information when a user input for the message is received.

The notification information may include a text or an image related to the category.

The method may further include: receiving, from a network, downlink control information (DCI) used for scheduling transmission of the screenshot image; and transmitting, to the network, the screenshot image based on the DCI.

The method may further include: performing an initial access procedure with the network based on a synchronization signal block (SSB); and transmitting the screenshot image to the network via a physical uplink shared channel (PUSCH), wherein the SSB and a demodulation reference signal (DM-RS) of the PUSCH are quasi-co-located (QCL) for a QCL type D.

The method may further include: controlling a transceiver to transmit the screenshot image to an artificial intelligence (AI) processor included in the network; and controlling the transceiver to receive AI-processed information from the AI processor, wherein the AI-processed information is an output of the category of the screenshot image or a learning model representing the category.

In another aspect, a user equipment includes: a memory configured to record a screenshot image; and a processor configured to determine a category of the screenshot image based on a text or an image included in the screenshot image, to extract a text or an image related to the category, and to generate notification information using the extracted text or image.

DESCRIPTION OF EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
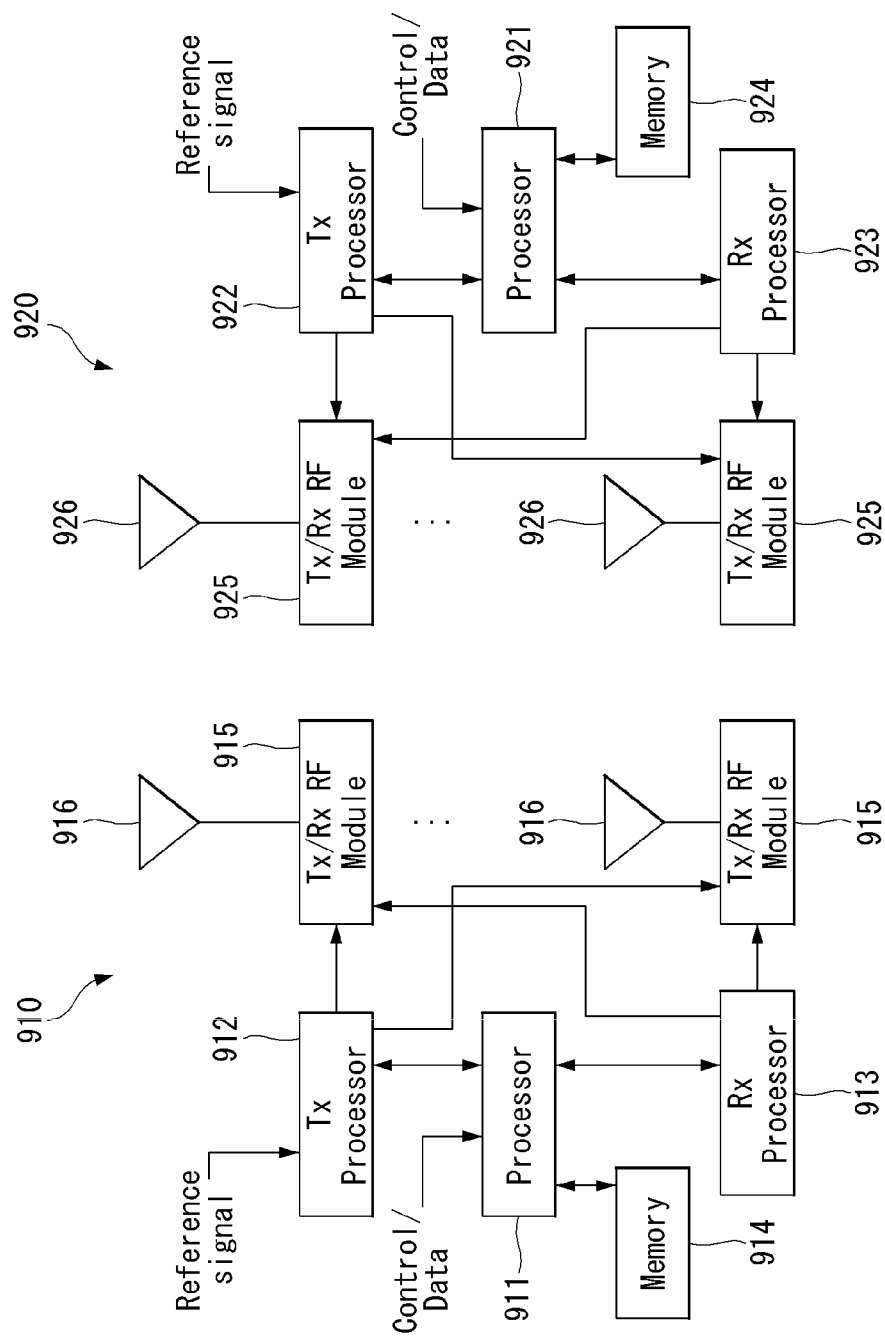
FIG. 1 is a block diagram of a wireless communication system to which the methods proposed in the present disclosure may be applied.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
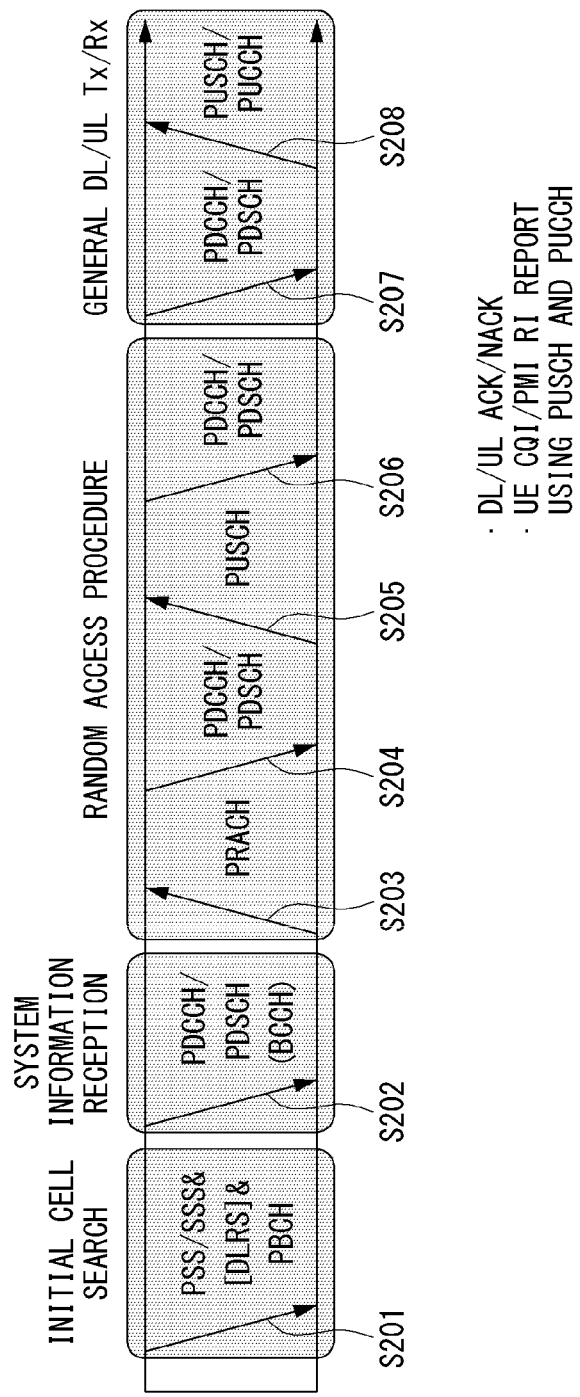
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL.

The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . .}. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
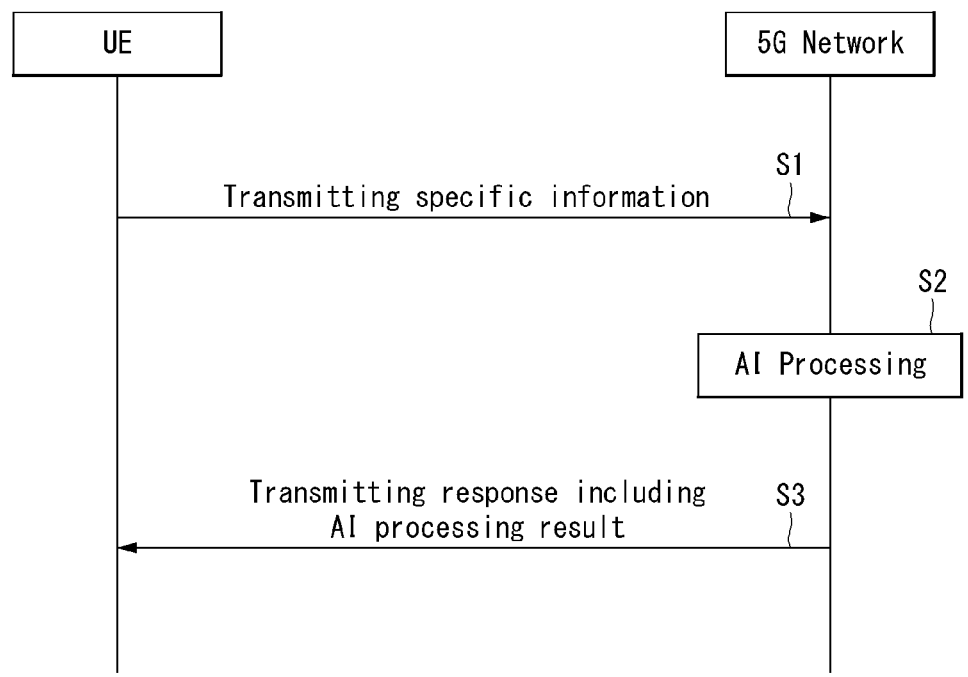
FIG. 3 shows an example of a basic operation of a user terminal and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G communication system Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
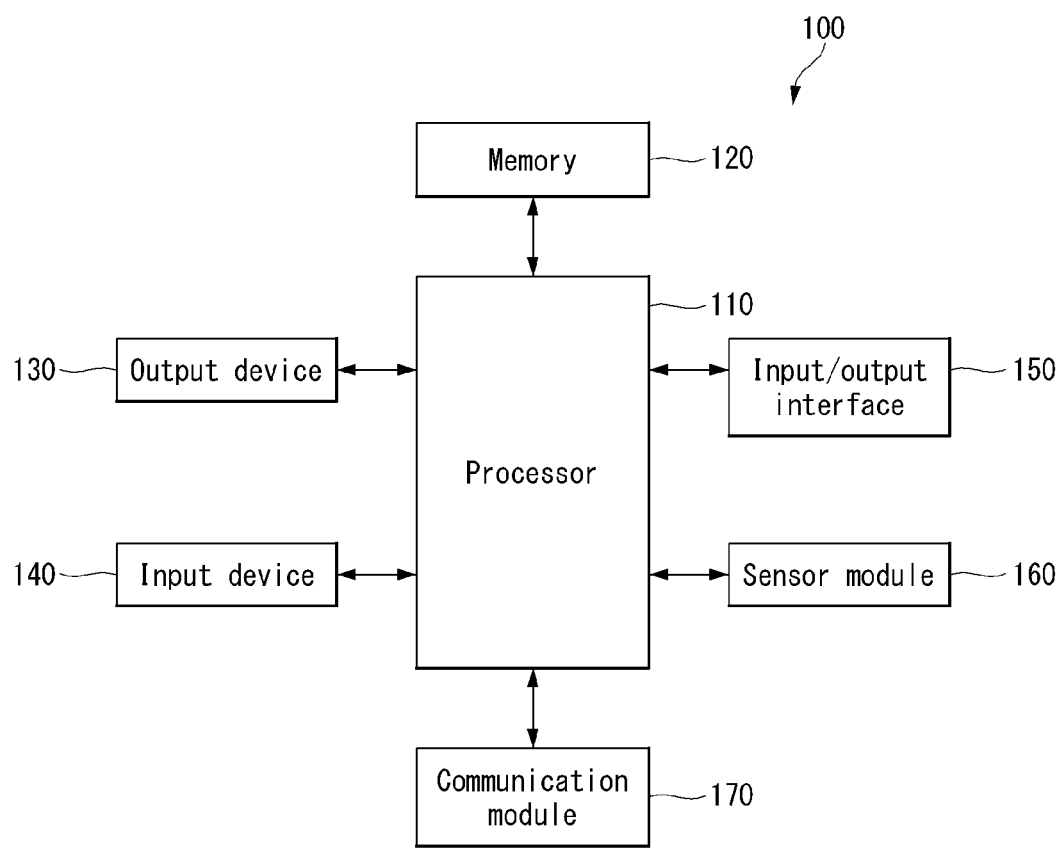
FIG. 4 is a block diagram of an electronic device.

FIG. 4 is a block diagram of an electronic device.

Referring to FIG. 4, the electronic device 100 may include at least one processor 110, a memory 120, an output device 130, an input device 140, an input/output interface 150, a sensor module 160, and a communication module 170.

The processor 110 may include at least one application processor (AP), at least one communication processor (CP), or at least one artificial intelligence (AI) processor. The application processor, the communication processor, or the AI processor may be included in different integrated circuit (IC) packages, respectively, or may be included in one IC package.

The application processor may control a plurality of hardware or software components connected to the application processor by driving an operating system or an application program, and perform various data processing/operation including multimedia. As an example, the application processor may be implemented as a system on chip (SoC). The processor 110 may further include a graphic processing unit (GPU) (not shown).

The communication processor may perform functions of managing a data link and converting a communication protocol in communication between the electronic device 100 and other electronic devices connected through a network. As an example, the communication processor may be implemented as the SoC. The communication processor may perform at least some of a multimedia control function.

In addition, the communication processor may control data transmission and reception of the communication module 170. The communication processor may be implemented to be included as at least a part of the application processor.

The application processor or the communication processor may load and process a command or data received from at least one of a non-volatile memory or other components connected to each into a volatile memory. In addition, the application processor or the communication processor may store data received from at least one of other components or generated by at least one of the other components in the non-volatile memory.

The memory 120 may include an internal memory or an external memory. The internal memory may include at least one of a volatile memory (e.g. dynamic RAM (DRAM)), static RAM (SRAM), synchronous dynamic RAM (SDRAM)) or a non-volatile memory (e.g. one time programmable ROM (OTPROM)), programmable ROM (PROM), erasable and programmable ROM (EPROM), electrically erasable and programmable ROM (EEPROM), mask ROM, flash ROM, NAND flash memory, NOR flash memory, etc.). According to an embodiment, the internal memory may take the form of a solid state drive (SSD). The external memory may further include flash drive, for example, compact flash (CF), secure digital (SD), micro secure digital (Micro-SD), mini secure digital (Mini-SD), extreme digital (xD) or a memory stick, etc.

The output device 130 may include at least one of a display module or a speaker. The output device 130 may display various data including multimedia data, text data, voice data, or the like to a user or output the sound.

The input device 140 may include a touch panel, a digital pen sensor, a key, or an ultrasonic input device, etc. As an example, the input device 140 may be the input/output interface 150. The touch panel may recognize a touch input in at least one of capacitive, pressure-sensitive, infrared, or ultrasonic types. In addition, the touch panel may further include a controller (not shown). In the case of the capacitive type, not only direct touch but also proximity recognition is possible. The touch panel may further include a tactile layer. In this case, the touch panel may provide a tactile reaction to the user.

The digital pen sensor may be implemented using the same or similar method to receiving a user's touch input or a separate recognition layer. The key may be a keypad or a touch key. The ultrasonic input device is a device that can confirm data by detecting a micro-sonic wave at a terminal through a pen generating an ultrasonic signal, and is capable of wireless recognition. The electronic device 100 may also receive a user input from an external device (for example, a network, computer, or server) connected thereto using the communication module 170.

The input device 140 may further include a camera module and a microphone. The camera module is a device capable of photographing images and videos, and may include one or more image sensors, an image signal processor (ISP), or a flash LED. The microphone may receive a voice signal and convert it into an electrical signal.

The input/output interface 150 may transmit commands or data input from the user through the input device or the output device to the processor 110, the memory 120, the communication module 170, and the like through a bus (not shown). For example, the input/output interface 150 may provide data for a user's touch input input through the touch panel to the processor 110. For example, the input/output interface 150 may output a command or data received from the processor 110, the memory 120, the communication module 170, etc. through the bus through the output device 130. For example, the input/output interface 150 may output voice data processed through the processor 110 to the user through the speaker.

The sensor module 160 may include at least one of a gesture sensor, a gyro sensor, a barometric pressure sensor, a magnetic sensor, an acceleration sensor, a grip sensor, a proximity sensor, an RGB (red, green, blue) sensor, a biometric sensor, a temperature/humidity sensor, an illuminance sensor or an ultra violet (UV) sensor. The sensor module 160 may measure physical quantities or sense an operating state of the electronic device 100 to convert the measured or sensed information into electrical signals. Additionally or alternatively, the sensor module 160 may include an E-nose sensor, an electromyography (EMG) sensor, an electroencephalogram (EEG) sensor (not shown), an electrocardiogram (ECG) sensor, a photoplethysmography (PPG) sensor, a heart rate monitor (HRM) sensor, a perspiration sensor, a fingerprint sensor, or the like. The sensor module 160 may further include a control circuit for controlling at least one sensor included therein.

The communication module 170 may include a wireless communication module or an RF module. The wireless communication module may include, for example, Wi-Fi, BT, GPS or NFC. For example, the wireless communication module may provide a wireless communication function using a radio frequency. Additionally or alternatively, the wireless communication module may include a network interface, modem, or the like for connecting the electronic device 100 to a network (e.g. Internet, LAN, WAN, telecommunication network, cellular network, satellite network, POTS or 5G network, etc.).

The RF module may be responsible for transmitting and receiving data, for example, transmitting and receiving an RF signal or a called electronic signal. As an example, the RF module may include a transceiver, a power amp module (PAM), a frequency filter, or a low noise amplifier (LNA), etc. In addition, the RF module may further include components for transmitting and receiving electromagnetic waves in a free space in wireless communication, for example, conductors or lead wires, etc.

The electronic device 100 according to various embodiments of the present disclosure may include at least one of a server, a TV, a refrigerator, an oven, a clothing styler, a robot cleaner, a drone, an air conditioner, an air cleaner, a PC, a speaker, a home CCTV, an electric light, a washing machine, and a smart plug. Since the components of the electronic device 100 described in FIG. 4 are exemplified as components generally provided in the electronic device, the electronic device 100 according to the embodiment of the present disclosure is not limited to the above-described components and may be omitted and/or added as necessary.

Figure 5:
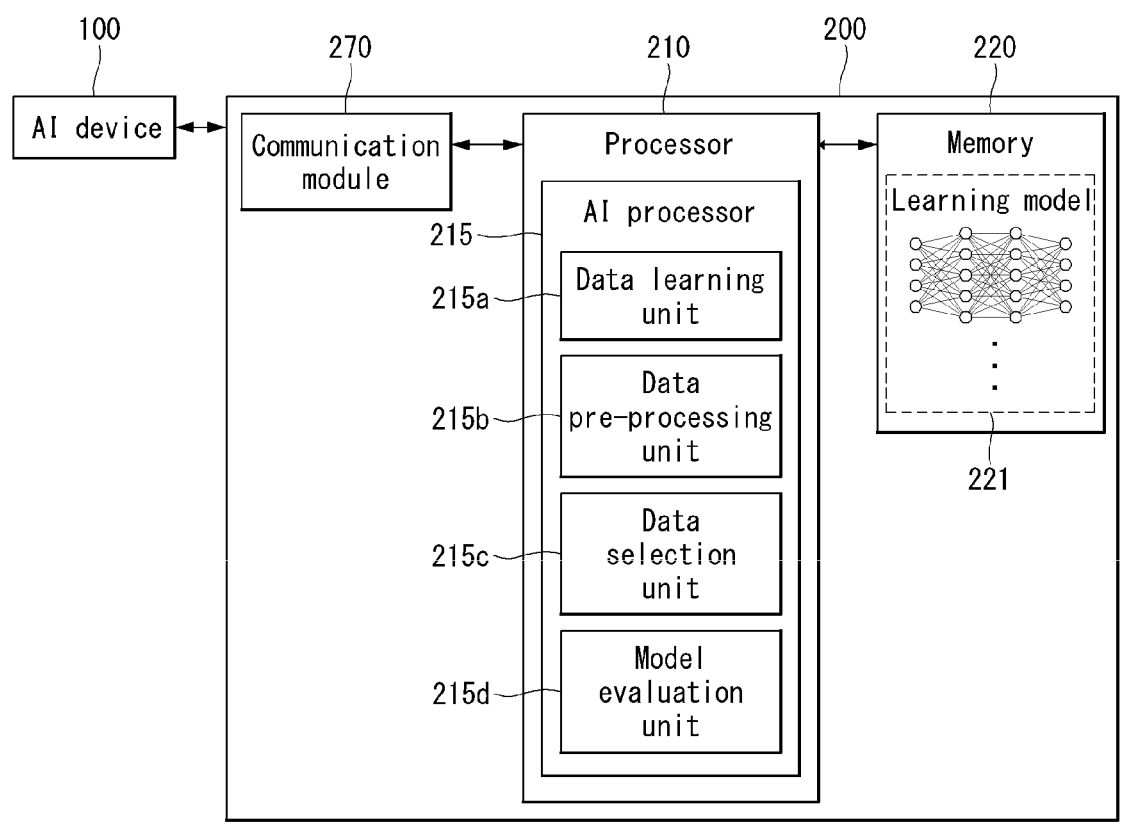
FIG. 5 is a schematic block diagram of an artificial intelligence (AI) server according to an embodiment of the present disclosure.

The electronic device 100 may perform an artificial intelligence-based control operation by receiving the AI processing result from a cloud environment shown in FIG. 5, or may perform AI processing in an on-device manner by having an AI module in which components related to the AI process are integrated into one module.

Hereinafter, an AI process performed in a device environment and/or a cloud environment or a server environment will be described with reference to FIGS. 5 and 6. FIG. 5 illustrates an example in which receiving data or signals may be performed in the electronic device 100, but AI processing for processing the input data or signals is performed in the cloud environment. In contrast, FIG. 6 illustrates an example of on-device processing in which the overall operation of AI processing on input data or signals is performed within the electronic device 100.

Figure 6:
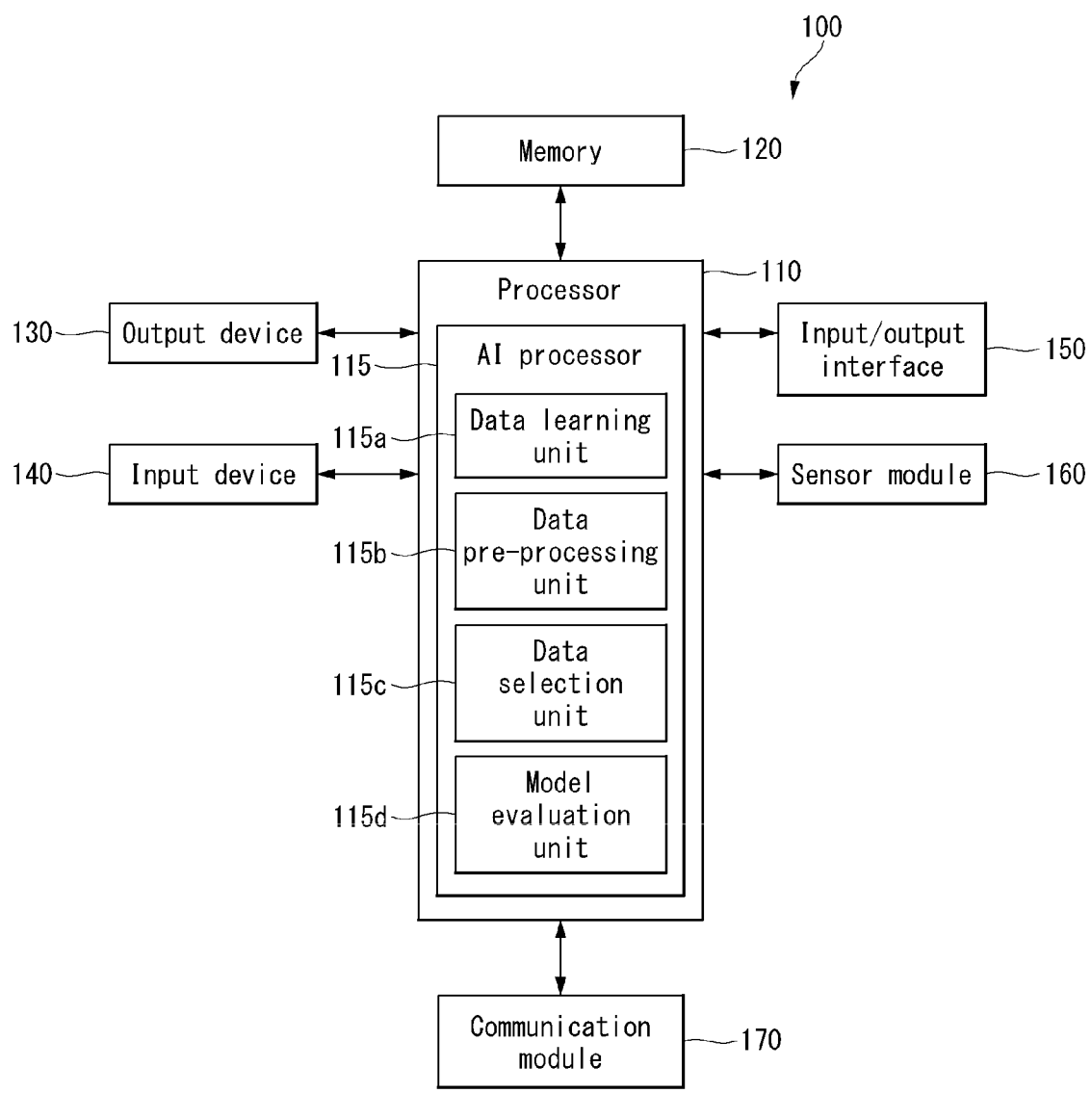
FIG. 6 is a schematic block diagram of an AI device according to another embodiment of the present disclosure.

In FIGS. 5 and 6, the device environment may be referred to as a 'client device' or an 'AI device', and the cloud environment may be referred to as a 'server'.

FIG. 5 illustrates a schematic block diagram of an AI server according to an embodiment of the present disclosure.

A server 200 may include a processor 210, a memory 220, and a communication module 270.

An AI processor 215 may learn a neural network using a program stored in the memory 220. In particular, the AI processor 215 may learn the neural network for recognizing data related to the operation of the AI device 100. Here, the neural network may be designed to simulate the human brain structure (e.g. the neuronal structure of the human neural network) on a computer. The neural network may include an input layer, an output layer, and at least one hidden layer. Each layer may include at least one neuron with weights, and the neural network may include a synapse connecting neurons and neurons. In the neural network, each neuron may output an input signal input through the synapse as a function value of an activation function for weight and/or bias.

A plurality of network modes may transmit and receive data according to each connection relationship so that neurons simulate synaptic activity of neurons that transmit and receive signals through the synapses. Here, the neural network may include a deep learning model developed from a neural network model. In the deep learning model, a plurality of network nodes are located on different layers and may exchange data according to a convolution connection relationship. Examples of the neural network model may include various deep learning techniques such as a deep neural network (DNN), a convolutional neural network (CNN), a recurrent neural network, a restricted Boltzmann machine, a deep belief network, and a deep Q-Network, and may be applied in fields such as vision recognition, voice recognition, natural language processing, and voice/signal processing.

On the other hand, the processor 210 performing the functions as described above may be a general-purpose processor (for example, a CPU), but may be a dedicated AI processor (for example, a GPU) for AI learning.

The memory 220 may store various programs and data necessary for the operation of the AI device 100 and/or the server 200. The memory 220 may be accessed by the AI processor 215, and read/write/modify/delete/update data by the AI processor 215. In addition, the memory 220 may store a neural network model (e.g. the deep learning model) generated through a learning algorithm for data classification/recognition according to an embodiment of the present disclosure. Furthermore, the memory 220 may store not only a learning model 221 but also input data, training data, and learning history, etc.

On the other hand, the AI processor 215 may include a data learning unit 215a for learning a neural network for data classification/recognition. The data learning unit 215a may learn criteria regarding what training data to use to determine data classification/recognition, and how to classify and recognize the data using the training data. The data learning unit 215a may learn the deep learning model by acquiring training data to be used for learning and applying the acquired training data to the deep learning model.

The data learning unit 215a may be manufactured in a form of at least one hardware chip and may be mounted on the server 200. For example, the data learning unit 215a may be manufactured in a form of a dedicated hardware chip for artificial intelligence, or may be manufactured as part of a general-purpose processor (CPU) or a dedicated graphics processor (GPU) and mounted on the server 200. In addition, the data learning unit 215a may be implemented as a software module. When implemented as the software module (or a program module including instructions), the software module may be stored in a computer-readable non-transitory computer readable media. In this case, at least one software module may be provided to an operating system (OS), or may be provided by an application.

The data learning unit 215a may learn the neural network model to have criteria for determining how to classify/recognize predetermined data using the acquired training data. At this time, a learning method by a model learning unit may be classified into supervised learning, unsupervised learning, and reinforcement learning. Here, the supervised learning may refer to a method of learning an artificial neural network in a state where a label for training data is given, and the label may mean a correct answer (or a result value) that the artificial neural network must infer when the training data is input to the artificial neural network. The unsupervised learning may mean a method of learning an artificial neural network in a state where the label for training data is not given. The reinforcement learning may mean a method in which an agent defined in a specific environment is learned to select an action or a sequence of actions that maximize cumulative rewards in each state. In addition, the model learning unit may learn the neural network model using a learning algorithm including an error backpropagation method or a gradient decent method. When the neural network model is learned, the learned neural network model may be referred to as the learning model 221. The learning model 221 is stored in the memory 220 and may be used to infer a result for new input data rather than the training data.

On the other hand, the AI processor 215 further include a data pre-processing unit 215b and/or a data selection unit 215c to improve analysis results using the learning model 221, or to save resources or time required to generate the learning model 221.

The data pre-processing unit 215b may pre-process the acquired data so that the acquired data may be used for learning/inference for situation determination. For example, the data pre-processing unit 215b may extract feature information as pre-processing for input data acquired through the input device, and the feature information may be extracted in a format such as a feature vector, a feature point, or a feature map.

The data selection unit 215c may select data necessary for learning among training data or training data pre-processed by the pre-processing unit. The selected training data may be provided to the model learn unit. For example, the data selection unit 215c may select only data for an object included in a specific region as training data by detecting a specific region among images acquired through the camera of the electronic device. In addition, the selection unit 215c may select data necessary for inference among input data acquired through the input device or input data pre-processed by the pre-processing unit.

In addition, the AI processor 215 may further include a model evaluation unit 215d to improve the analysis results of the neural network model. The model evaluation unit 215d may input evaluation data into the neural network model, and when the analysis result output from the evaluation data does not satisfy a predetermined criterion, may cause the model learning unit to learn again. In this case, the evaluation data may be preset data for evaluating the learning model 221. For example, among the analysis results of the learned neural network model for the evaluation data, when the number or ratio of evaluation data whose analysis results are not accurate exceeds a preset threshold, the model evaluation unit 215d may evaluate that a predetermined criterion are not satisfied.

The communication module 270 may transmit the AI processing result by the AI processor 215 to an external electronic device.

As described above, in FIG. 5, an example in which an AI process is implemented in the cloud environment due to computing operation, storage, and power constraints has been described, however, the present disclosure is not limited thereto, and the AI processor 215 may be implemented by being included in a client device. FIG. 6 is an example in which AI processing is implemented in the client device, and is the same as that shown in FIG. 5 except that the AI processor 215 is included in the client device.

FIG. 6 illustrates a schematic block diagram of an AI device according to another embodiment of the present disclosure.

The function of each configuration shown in FIG. 6 may refer to FIG. 5. However, since the AI processor is included in a client device 100, it may not be necessary to communicate with the server (200 in FIG. 5) in performing a process such as data classification/recognition, etc., accordingly, an immediate or real-time data classification/recognition operation is possible. In addition, since it is not necessary to transmit personal information of the user to the server (200 in FIG. 5), it is possible to classify/recognize data for the purpose without leaking the personal information.

On the other hand, each of the components shown in FIGS. 5 and 6 shows functional elements divided functionally, and at least one component may be implemented in a form (e.g. AI module) that is integrated with each other in a real physical environment. It goes without saying that components not disclosed may be included or omitted in addition to the plurality of components shown in FIGS. 5 and 6.

Figure 7:
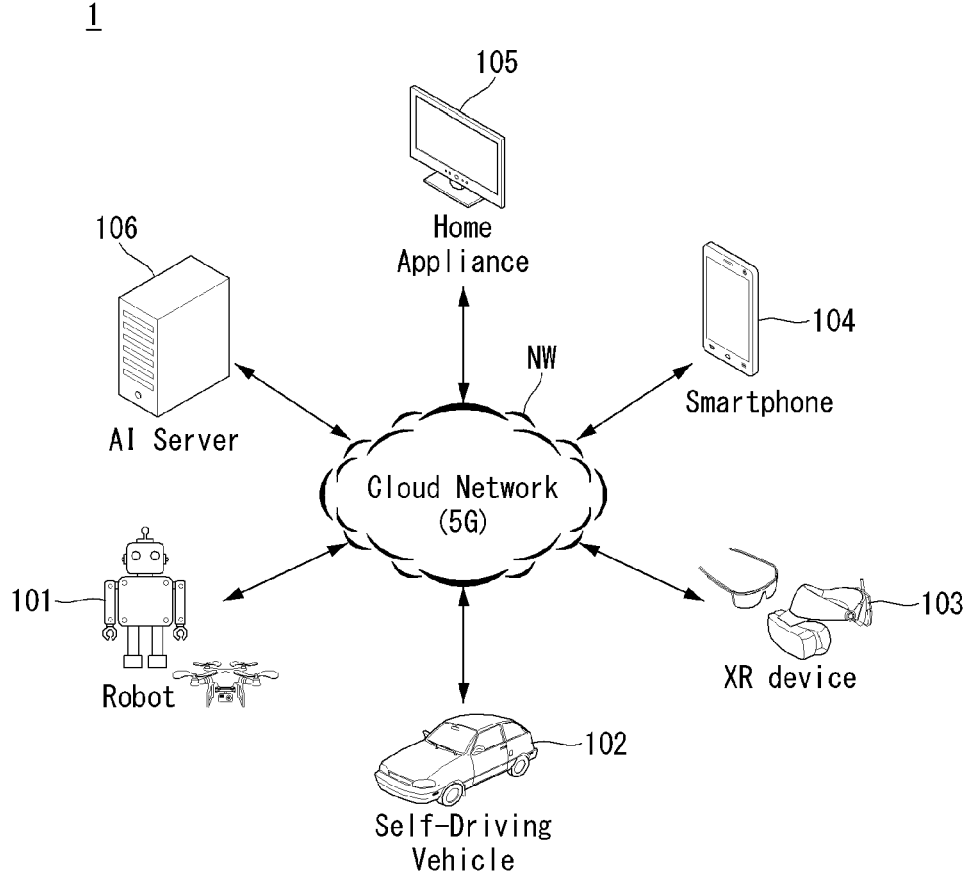
FIG. 7 is a conceptual diagram showing an embodiment of an AI device.

FIG. 7 is a conceptual diagram illustrating an embodiment of an AI device.

Referring to FIG. 7, in an AI system 1, at least one of an AI server 106, a robot 101, a self-driving vehicle 102, an XR device 103, a smartphone 104, or a home appliance 105 are connected to a cloud network NW. Here, the robot 101, the self-driving vehicle 102, the XR device 103, the smartphone 104, or the home appliance 105 applied with the AI technology may be referred to as the AI devices 101 to 105.

The cloud network NW may mean a network that forms a part of a cloud computing infrastructure or exists in the cloud computing infrastructure. Here, the cloud network NW may be configured using the 3G network, the 4G or the Long Term Evolution (LTE) network, or the 5G network.

That is, each of the devices 101 to 106 constituting the AI system 1 may be connected to each other through the cloud network NW. In particular, each of the devices 101 to 106 may communicate with each other through a base station, but may communicate directly with each other without going through the base station.

The AI server 106 may include a server performing AI processing and a server performing operations on big data.

The AI server 106 may be connected to at least one of the robots 101, the self-driving vehicle 102, the XR device 103, the smartphone 104, or the home appliance 105, which are AI devices constituting the AI system, through the cloud network NW, and may assist at least some of the AI processing of the connected AI devices 101 to 105.

At this time, the AI server 106 may learn the artificial neural network according to the machine learning algorithm on behalf of the AI devices 101 to 105, and directly store the learning model or transmit it to the AI devices 101 to 105.

At this time, the AI server 106 may receive input data from the AI devices 101 to 105, infer a result value for the received input data using the learning model, generate a response or a control command based on the inferred result value and transmit it to the AI devices 101 to 105.

Alternatively, the AI devices 101 to 105 may infer the result value for the input data directly using the learning model, and generate a response or a control command based on the inferred result value.

Figure 8:
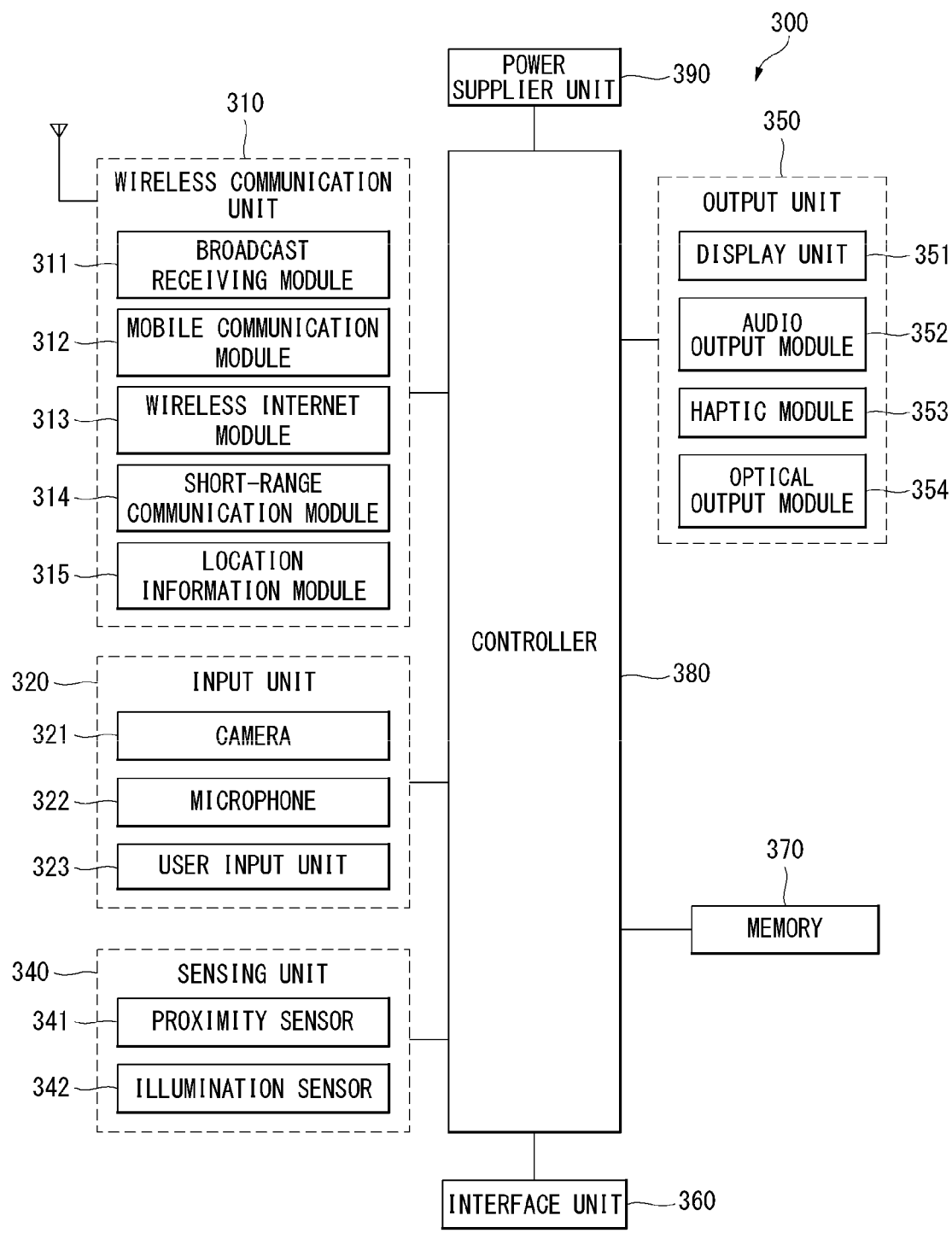
FIG. 8 is a block diagram illustrating a mobile terminal related to the present disclosure.
Figure 9:
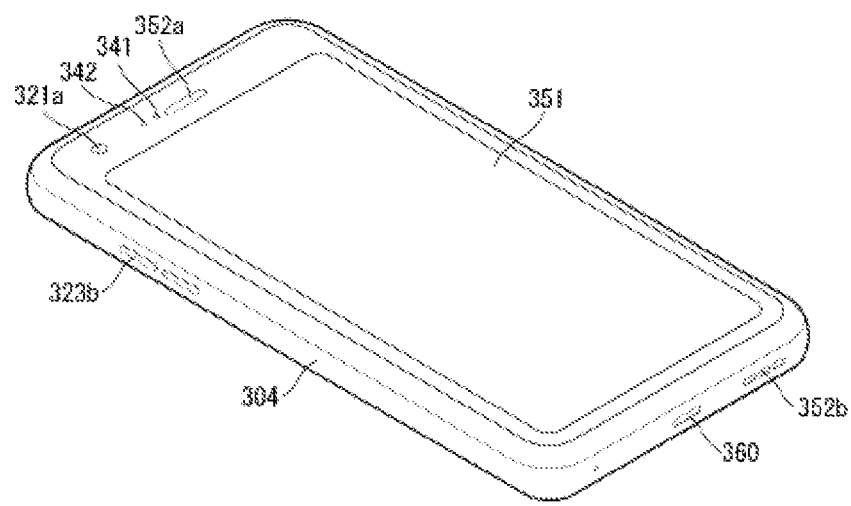
FIGS. 9 and 10 are conceptual diagrams of an example of a mobile terminal related to the present disclosure as viewed from different directions.
Figure 10:
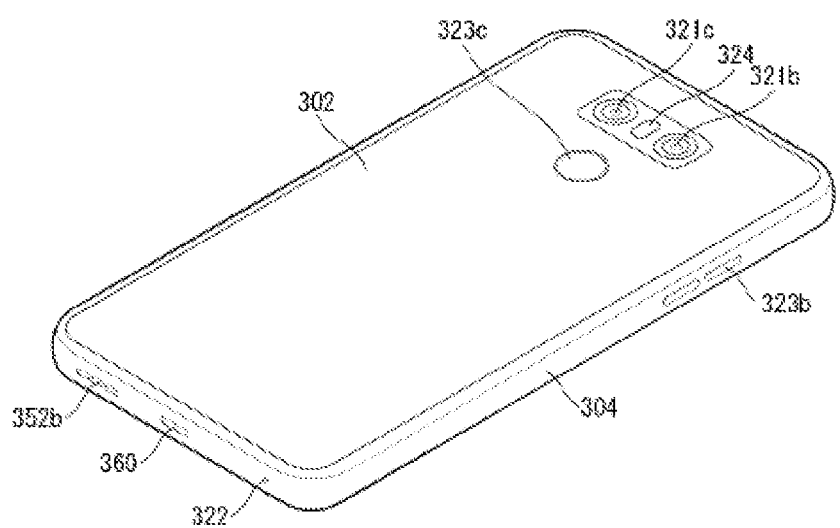

FIG. 8 is a block diagram illustrating a mobile terminal relating to the present disclosure. FIGS. 9 and 10 are conceptual diagrams of an example of a mobile terminal relating to the present disclosure, as viewed from different directions.

The mobile terminal 300 may comprise a wireless communication part 310, an input part 320, a sensing part 340, an output part 350, an interface 360, a memory 370, a controller 380, and a power supply part 390. The components shown in FIG. 8 are not essential for implementing a mobile terminal, and thus the mobile terminal described herein may have more or fewer components than those listed above.

More specifically, the wireless communication part 310, among the aforementioned components, may comprise one or more modules that enable wireless communications between the mobile terminal 300 and a wireless communication system, between the mobile terminal 300 and another mobile terminal 300, or between the mobile terminal 300 and an external server. In addition, the wireless communication part 310 may comprise one or more modules for connecting the mobile terminal 300 to one or more networks.

The wireless communication part 310 may comprise at least one among a broadcast receiving module 311, a mobile communication module 312, a wireless internet module 313, a short-range communication module 314, and a location information module 315.

The input part 320 may comprise a camera 321 or image input part for receiving image signal input, a microphone 322 or audio input part for receiving audio signal input, and a user input part 323 (for example, a touch key, a push key (or mechanical key), etc.) for receiving information from a user. Audio data or image data collected by the input part 320 may be analyzed and processed by the user's control commands.

The sensing part 340 may comprise one or more sensors for sensing at least one among information inside the mobile terminal, information on the surrounding environment of the mobile terminal, and user information. For example, the sensing part 340 may comprise at least one among a proximity sensor 341, an illumination sensor 342, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., camera (refer to 321)), a microphone (refer to 322), a battery gauge, an environment sensor (e.g., barometer, hygrometer, thermometer, radiation detection sensor, thermal sensor, gas sensor, etc.), and a chemical sensor (e.g., electronic nose, health care sensor, biometric sensor, etc.). On the other hand, the mobile terminal disclosed herein may use information sensed by at least two of these sensors in combination.

The output part 350 may be configured to produce an output related to visual, auditory, or tactile sense, and may comprise at least one among a display 351, an audio output part 352, a haptic module 353, and optical output part 354.

The display 351 may be implemented as a touchscreen by forming an interlayer structure together with a touch sensor or by being integrated with the touch sensor. Such a touchscreen may function as a user input part 323 providing an input interface between the mobile terminal 300 and the user and, at the same time, provide an output interface between the mobile terminal 300 and the user.

A plurality of audio output parts 352 may be provided, and may comprise a first audio output part 352a located on the front as depicted in FIG. 9 and a second audio output part 352b located on the rear as depicted in FIG. 10. The first audio output part 352a is often used when the user hear voice during a phone call with their ear pressed to it, and the second audio output part 352b may be used to hear voice while keeping it at a distance from their ear. Accordingly, the output of the second audio output part 352b may be higher than that of the first audio output part 352a.

The interface 360 may serve as a path to various types of external devices with which the mobile terminal 300 connects. The interface 360 may include at least one among a wired/wireless headset port, an external charger port, a wired/wireless data port, a memory card port, a port connecting a device equipped with an identification module, an audio input/output (I/O) port, a video input/output (I/O) port, and an earphone port. To handle a connection of an external device to the interface 360, the mobile terminal 300 may perform appropriate control relating to the connected external device.

Additionally, the memory 370 stores data supporting various functions of the mobile terminal 300. The memory 370 may store multiple application programs (or applications) running on the mobile terminal 300 and data and commands for the operation of the mobile terminal 300. At least some of these application programs may be downloaded from an external server via wireless communication. Also, at least some of these application programs may exist on the mobile terminal 300 from the time of shipment to provide basic functions (e.g., making and receiving calls and receiving and sending messages) of the mobile terminal 300. The application programs may be stored in the memory 370 and installed on the mobile terminal 300, and may be run by the controller 380 to perform the operation (or functions) of the mobile terminal.

The controller 380 typically controls the overall operation of the mobile terminal 300, in addition to the operations related to the application programs. The controller 380 may provide or process appropriate information or functions to the user by processing signals, data, information, etc. inputted or outputted through the above-described components or by running an application program stored in the memory 370.

In addition, the controller 380 may control at least some of the components illustrated in FIG. 8, in order to run an application program stored in the memory 370. Furthermore, the controller 380 may operate at least two of the components included in the mobile terminal 300 in combination, in order to run the application program.

The power supply part 390 may receive external power or internal power and provide power to the components included in the mobile terminal 300 under control of the controller 380. The power supply part 390 comprises a battery, and the battery may be a built-in battery or replaceable battery.

At least some of the above components may work in cooperation with one another in order to implement the operation, control, or control method of the mobile terminal according to various exemplary embodiments to be described below. Moreover, the operation, control, or control method of the mobile terminal may be implemented on the mobile terminal by running at least one application program stored in the memory 370.

Referring now to FIGS. 9 and 10, the disclosed mobile terminal 300 has a bar-type terminal body. However, the present disclosure is not limited to this, but may be applied to various structures, including watch-type phones, clip-type phones, glasses-type phones, and folder-type, flip-type, slider-type, swing-type, and swivel-type phones in which two or more bodies are coupled to move relative to each other. A description of a particular type of mobile terminal, although relevant to a particular type of mobile terminal, is generally applicable to other types of mobile terminals.

Herein, the terminal body can be understood as a concept that refers to the mobile terminal 300 as at least one aggregate.

The mobile terminal 300 comprises a housing (e.g., housing, window, etc.) that forms the outer appearance. Conventionally, the front and rear of the mobile terminal 300 are constructed by using a front case and a rear case, and electronic parts are mounted in an internal space between the front case and the rear case. However, the recent trend is that the display 351 takes up much of the front as the display 351 becomes larger in size, and the size of a window 351a protecting the front of the display 351 is enlarged to cover the entire front side of the mobile terminal 300. In this case, the periphery of the rear case 302 may protrude forward and cover the side of the mobile terminal 300.

The front case may be omitted. Instead, a middle frame 305 for reinforcing the rigidity of the mobile terminal 300 while supporting the back of the display 351 may be provided, and the housing of the mobile terminal 300 may be constructed by mounting electronic components on the back of the middle frame 305 and connecting the rear case to the back.

A side case 304 may be separately provided to cover the side of the mobile terminal 300, and the side case 304 may be integrated with the middle frame 305 described above. That is, a portion of the periphery of the middle frame 305 exposed to the outside may be the side case 304. When the side case 304 comprises a metal material, the side case 304 may be used as part of an antenna, and the rear case 302 may be made of a different material from the side case 304. A design employing metal or glass for the rear case 203 may be adopted.

As described above, the housing that forms the outer appearance of the mobile terminal 300 comprises a plurality of cases 302 and 304 and a window 351a, and water may infiltrate through gaps between the cases 302 and 304 and the window 351a. A waterproof tape, a waterproof adhesive, or a waterproof ring 308 made of resin, rubber or elastic material may be used to shield the gaps between the cases 302 and 304 and the window 351a of the mobile terminal 300 to prevent water from infiltrating the inner space in which components are mounted. As the functions of the mobile terminal 300 are diversified, the waterproof function is becoming essential because the mobile terminal 300 is used even in a swimming pool or on a rainy day.

The display 351, the first audio output part 352a, the proximity sensor 341, illumination sensor 342, the optical output part 354, the first camera 321a, and a front input part (not shown) may be placed on the front of the mobile terminal 300, and some of the above components may be omitted or placed elsewhere in order to enlarge the display 351 on the front.

The mobile terminal 300 will be described with an example in which a side input part 323b, the microphone 322, the second audio output pat 352b, and the interface 360 are placed on the side of the mobile terminal 300 and a second camera 321b and a rear input part 323c are placed on the rear of the terminal body. The present disclosure is not limited to this configuration, but the side input part 323b, microphone 322, second audio output part 352b, and interface 360 may be placed on the back or front of the mobile terminal 300.

The display 351 displays (outputs) information processed by the mobile terminal 300. For example, the display 351 may display execution screen information of an application program running on the mobile terminal 300 or user interface (UI) and graphic user interface (GUI) information corresponding to the execution screen information.

The optical output part 354 may output light for indicating an event generation. Examples of the event may include message reception, call signal reception, a missed call, an alarm, a schedule notice, email reception, information reception through an application, and the like. Upon sensing the user's acknowledgement of the event, the controller 380 may control the optical output part 354 to stop the light output.

The first camera 321a may process image frames of still pictures or video acquired by the image sensor in a capture mode or a video call mode. The processed image frames may then be displayed on the display 351 or stored in the memory 370.

Input received by the front input part 323a and side input part 323b may be set in various ways. For example, the front input part may receive a command input such as a menu, home key, cancel, and search, and the side input part 323b may receive a command input such as controlling the volume of sound outputted from the first or second audio output part 352a and 352b and switching the display 351 to touch recognition mode. The rear input part 323c may be implemented in such a form that enables touch input, push input, or a combination of the two.

Meanwhile, the rear input part 323c may be provided on the rear of the terminal body as another example of the user input part 323. The rear input part 323c is manipulated to receive command inputs for controlling the operation of the mobile terminal 300. For example, it may receive command inputs such as power on/off, start, finish, and scroll and command inputs such as controlling the volume of sound outputted from the first and second audio output parts 352a and 152b and switching the display 351 to touch recognition mode. The rear input part 323c may be implemented in such a manner as to enable touch input, push input, or a combination thereof.

The rear input part 323c may be located to overlap the display 351 on the front in the thickness direction of the terminal body. In one example, the rear input part 323c may be located on the rear upper edge of the terminal body so that the user can easily manipulate the terminal body with an index finger when gripping it in one hand. However, the present disclosure is not necessarily limited thereto, and the position of the rear input part 323c may be changed.

In the case where the rear input part 323a is provided on the rear of the terminal 300's body, a new type of user interface may be implemented using it. Moreover, the above-explained touchscreen or rear input part 323c may replace at least some of the functions of the front input part provided on the front of the terminal body, so that the display 351 may be configured as a larger screen if the front input part is not provided on the front of the terminal body.

Meanwhile, the mobile terminal 300 may comprise a fingerprint recognition sensor for recognizing a user's fingerprint, and the controller 380 may use fingerprint information detected through the fingerprint recognition sensor as a means of authentication. The fingerprint recognition sensor may be embedded in the display unit 351 or the user input part 323.

The microphone 322 is configured to receive the user's voice and other sounds. The microphone 322 may be provided at a plurality of positions and configured to receive stereo audio input.

The interface 360 may serve as a path that allows the mobile terminal 300 to connect with an external device. For example, the interface 360 may be at least one among a connection terminal for connecting with another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 300. The interface unit 360 may be implemented in the form of a socket for accommodating an external card, such as Subscriber Identification Module (SIM), User Identity Module (UIM), or a memory card for information storage.

The second camera 321b may be located on the rear of the terminal body. In this case, the second camera 321b captures images in a direction substantially opposite to the direction in which the first camera 321 captures images.

The second camera 321b may comprise a plurality of lenses arranged along at least one line. Alternatively, the plurality of lenses may be arranged in a matrix configuration. Such a camera may be called an "array camera". If the second camera 321b is configured as an array camera, it may capture images in various ways by using a plurality of lenses and acquire images of better quality.

A flash 324 may be placed adjacent to the second camera 321b. When capturing an object with the second camera 321b, the flash 324 may illuminate the object.

The second audio output part 352b may be added to the terminal body. The second audio output part 352b may implement a stereo function together with the first audio output part 352a, and also may be used to implement a speakerphone mode during a phone call.

At least one antenna for wireless communication may be provided on the terminal body. The antenna may be embedded in the terminal body or formed in the case. For example, an antenna constituting part of the broadcast receiving module 311 (see FIG. 8) may be configured to be pulled out of or pushed into the terminal body. Alternatively, a film-type antenna may be attached to an inner surface of the rear cover 303, or a case comprising a conductive material may be configured to function as an antenna.

A power supply part 390 (see FIG. 8) for supplying power to the mobile terminal 300 is provided on the terminal body. The power supply part 390 may comprise a battery 391 that is embedded in the terminal body or detachably coupled to the outside of the terminal body.

The battery 391 may be configured to receive power via a power source cable connected to the interface 360. Also, the battery 391 may be configured to be wirelessly charged through a wireless charger. Wireless charging may be implemented by magnetic induction or resonance (electromagnetic resonance).

An accessory for protecting the exterior or assisting or extending the functionality of the mobile terminal 300 may be added to the mobile terminal 300. An example of such an accessory may include a cover or pouch that covers or houses at least one side of the mobile terminal 300. The cover or pouch may be configured to interface with the display 351 and extend the functionality of the mobile terminal 300. Another example of the accessory may include a touch pen for assisting or extending touch input on the touchscreen.

Hereinafter, embodiments associated with a control method that can be implemented in a mobile terminal configured as above will be described with reference to the accompanying drawings. It should be understood by those skilled in the art that the present disclosure can be embodied in other specific forms without departing from the concept and essential characteristics thereof.

Figure 11:
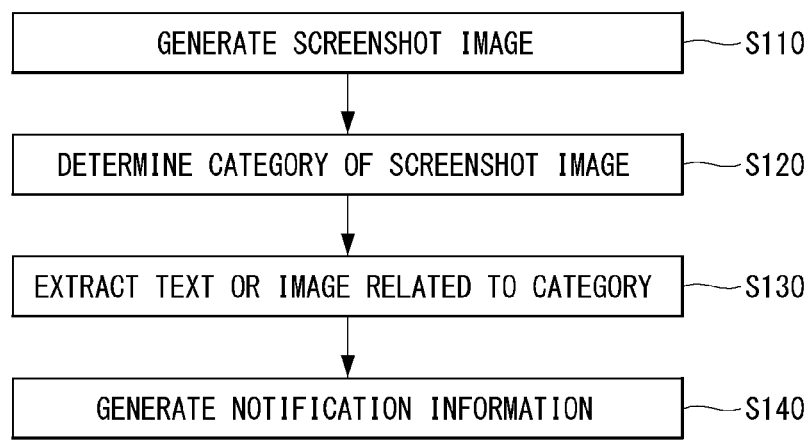
FIG. 11 is a flowchart of a notification management method of a mobile terminal according to an embodiment of the present disclosure.

FIG. 11 is a flowchart of a notification management method of a mobile terminal according to an embodiment of the present disclosure.

Referring to FIG. 11, the processor 110 may generate a screenshot image (S110).

As an example, the processor 110 may generate a screenshot image from an image being displayed through the touch screen 151 in response to a user input. The user input may be received by an input button provided in the case portion of the mobile terminal 300 or may be received by the touch screen 151. As another example, the processor 110 may control the transceiver to receive an image of a display screen being displayed on an external terminal in response to a user input. As another example, the processor 110 may control the transceiver to receive an image of a display screen being recorded in the memory 120 of the external terminal in response to a user input.

The processor 110 may determine a category of the screenshot image (S120).

For example, the processor 110 may extract features from text or an image included in the screenshot image and determine a category of the screenshot image using the extracted features and a learning model. The extracted features include, but are not limited to, a contour feature, a texture feature, a spatial feature, or an intensity feature. Feature extracting methods include a scale-invariant feature transform (SIFT) method and a speed-up robust features (SURF) method but are not limited thereto.

The category may include a performance ticket, a coupon, sound source information, or an invitation card. Screenshot images regarding the performance ticket, the coupon, the sound source information, or the invitation card may include different contents. For example, the performance ticket may include words representing a type of the performance such as "exhibition", "movie", or "musical", a schedule, a venue (or location), a ticket number, a reservation number, or text or an image representing a representative image of the performance. For example, the coupon may include a word indicating the coupon such as "coupon" and "exchange voucher", a barcode, a coupon content, an valid term, or text or an image indicating a place of usage. For example, the sound source information may include text or an image representing a song, a singer, an album, a genre, a sound source title, or a singer's name. For example, the invitation card may include text or an image representing content, schedule, location, or representative image of a wedding, a first-birthday party, or an event.

The processor 110 may extract text or an image related to the category (S130).

In an embodiment, the processor 110 may recognize text or an image related to a category and extract the text or image related to the category by parsing the recognized text or image. The text or image related to the category may include the performance ticket, coupon, sound source information, or contents of an invitation card described above The processor 110 may extract text or an image related to the category, and store it in the memory 120 or temporarily store it. In the case of the performance ticket, the processor 110 may extract at least one of a keyword representing a performance ticket (e.g., ticket, reservation, reservation number, etc.), schedule, location, ticket number, reservation number, or representative image from the screenshot image. In the case of the coupon, the processor 110 may extract at least one of a keyword representing the coupon (e.g., coupon, exchange ticket, etc.), a barcode, coupon contents, valid term, or a place of usage from the screenshot image. In the case of the sound source information, the processor 110 may extract at least one of a keyword (e.g., song, singer, album, genre, etc.) representing sound source information, a title, or a singer name from the screenshot image. In the case of the invitation card, the processor 110 may extract at least one of a keyword representing the invitation card (e.g., wedding, first birthday, wedding, invitation), event content, schedule, location, or representative image from the screenshot image. Meanwhile, it is obvious that text or image that may be extracted are not limited to the above-listed elements, and text or images related to the category may be additionally extracted in addition to the above-listed elements.

The processor 110 may generate notification information (S140).

The notification information may include text or an image extracted from the screenshot image by the processor 110. The notification information may be stored in the memory 120 in association with a gallery application, a calendar application, or a music application. The notification information stored in the memory 120 may be output or transmitted to an external terminal in association with a gallery application, a calendar application, or a music application.

The mobile terminal 300 according to an embodiment may generate notification information including text or image at the same time as extracting text or image related to a category.

The mobile terminal 300 according to an embodiment may display a message (e.g., a pop-up message) for generating notification information and may generate notification information upon receiving a user input for the displayed message. The message may be displayed to overlap a partial region of a display screen displayed through the touch screen 151. In addition, the message may be displayed together with a preview of notification information to be stored together. The preview may include a part or entirety of the notification information.

Figure 12:
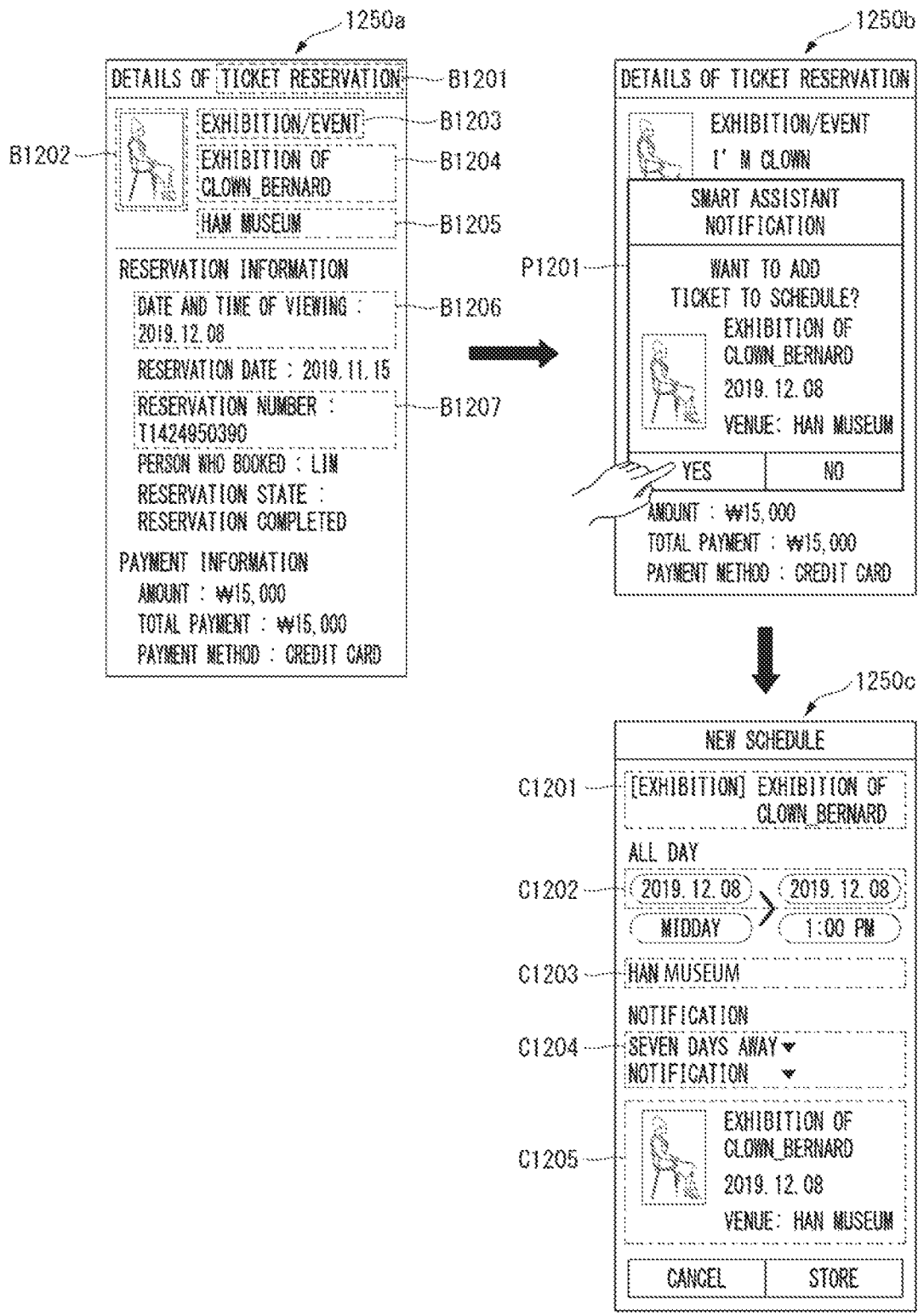
FIG. 12 is an implementation example of a method for generating a notification regarding a performance ticket.

FIG. 12 is an implementation example of a method for generating a notification regarding a performance ticket.

Referring to FIG. 12, the mobile terminal 300 outputs at least one text or image related to a performance ticket through the touch screen 151. The display screen displayed through the touch screen 151 includes a representative image of the performance ticket and various texts related to the performance ticket (e.g., 'ticket reservation', 'exhibition/event', 'view date and time', 'reservation number'., 'Exhibition Halls 1 and 2 of the Hangaram Museum of Art, Seoul Arts Center').

When an input for generating a screenshot image for a user's display screen is received, the processor 110 may generate a screenshot image corresponding to the display screen output through the touch screen 151 in response to the reception. In addition, in response to a user command, the mobile terminal 300 may receive a screenshot image corresponding to a display screen being displayed through a display of an external terminal capable of communicating through a network or receive a screenshot preciously stored in the memory 120 of the mobile terminal 300 or the external terminal.

The processor 110 may determine a category of an image based on text or an image included in the screenshot image. In the case of the performance ticket shown in FIG. 12, the processor 110 may detect 'ticket reservation (B1201)', 'representative image (B1202)', 'exhibition/event (B1203)', 'title (B1204)', 'place (B1205)', 'viewing date and time (B1206)', and 'reservation number (B1207)' and determine the category of the screenshot image as a 'performance ticket' using the detected information and a previously learned learning model.

The processor 110 may extract a preset text or image corresponding to the 'performance ticket' for which the category of the screenshot image is determined. For example, the processor 110 may extract a representative image B1202, a title B1204, a schedule B1206, a location B1205, and a reservation number B1207 from the screenshot image.

The processor 110 may display a message P1201 for confirming whether to store notification information using the extracted data on the display screen in an overlapping manner. The processor 110 may execute an application related to a performance ticket when a user input for a message P1201 for confirming whether to store notification information is received and a storage command is input. For example, the application related to the performance ticket may be a calendar application. Meanwhile, the processor 110 may not display the message P1201 for confirming the user's scheduling intention and may generate a screenshot image and execute an application related to a performance ticket at the same time.

When the calendar application is executed, the processor 110 may reflect the extracted data to correspond to each item of the calendar application. For example, a performance title B1204 is input to title C1201 of a schedule of the calendar application, a performance schedule B1206 is input to a performance date C1202, and at least one of a representative image B1202, a title B1204, a schedule B1206, a location B1205, or a reservation number (B1207) may be input to the schedule contents C1205 but is not limited thereto. Meanwhile, a notification (or alarm) timing C1204 may be set based on a response pattern for a notification of a user of the schedule application, or a notification timing C1204 may be set according to a preset value.

Thereafter, when the user's storage command is input, the processor 110 may store the notification information in the memory 120 using the calendar application or control the transceiver to transmit the notification information to an external terminal capable of communicating with the mobile terminal 300 through a network.

Figure 13:
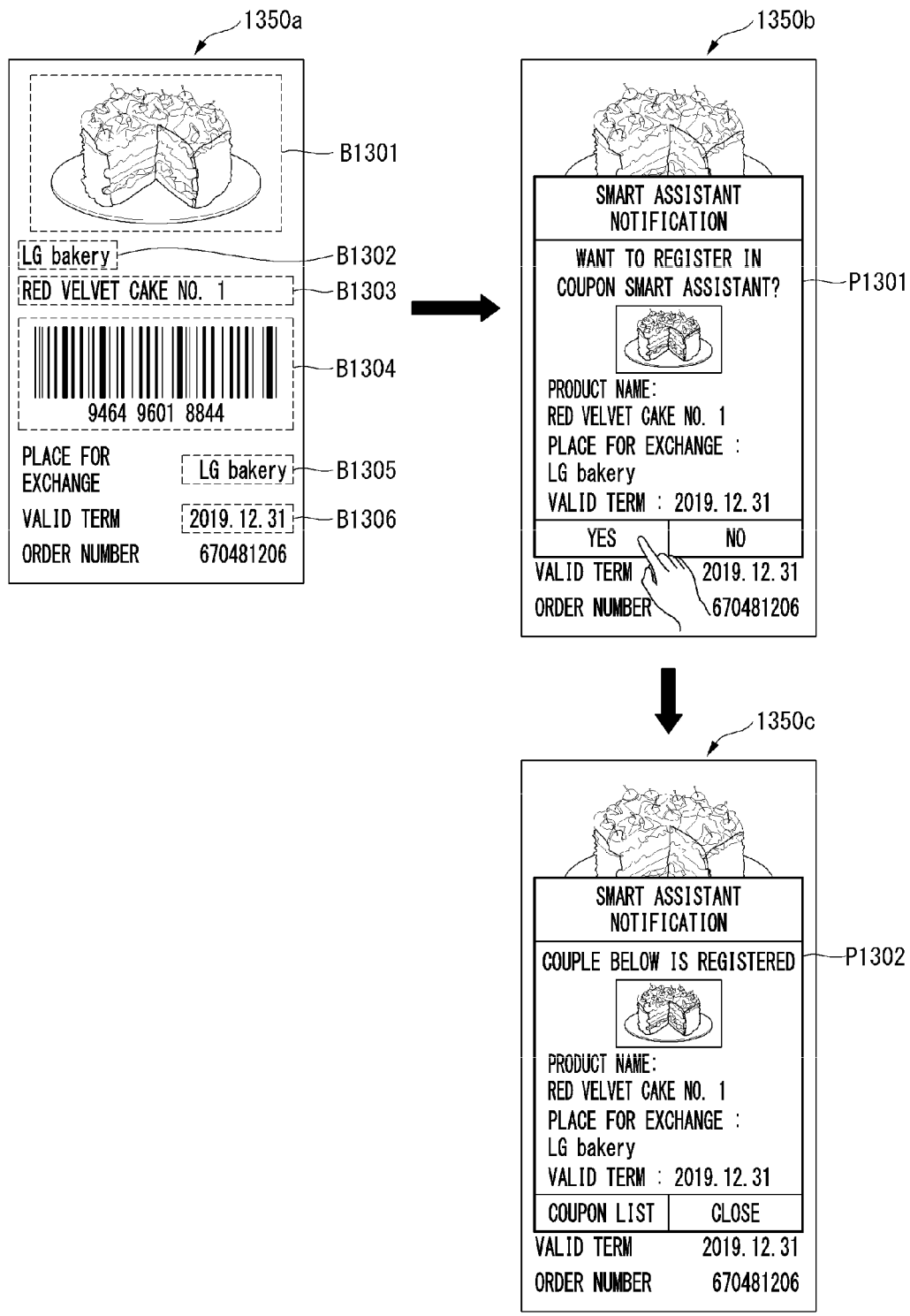
FIG. 13 is an implementation example of a method for generating a notification regarding a coupon.

FIG. 13 shows an implementation example of a method for generating a notification regarding a coupon.

Referring to FIG. 13, the mobile terminal 300 outputs at least one text or image related to a coupon through the touch screen 151. The display screen displayed through the touch screen 151 includes a representative image of the coupon and various texts related to the coupon (e.g., LG bakery, 'Red Velvet Cake No. 1', 'barcode', 'place for exchange', 'valid term', 'coupon number', etc.).

The processor 110 may determine a category of an image based on text or an image included in the screenshot image. In the case of the coupon shown in FIG. 13, the processor 110 may detect a 'representative image B1301', a 'business name B1302', a 'product name B1303', a 'barcode image B1304', a 'place of usage (or place for exchange B1305', and 'valid term B1306', and determine the category of the screenshot image as 'coupon' using the detected information and previously learned learning model.

The processor 110 may extract a preset text or image corresponding to the 'coupon' in which the category of the screenshot image is determined. For example, the processor 110 may extract the representative image B1301, the product name B1303, the place of usage B1305, and the valid term B1306 from the screenshot image.

The processor 110 may display a message P1301 for confirming whether to store the notification information using the extracted data on the display screen in an overlapping manner. The processor 110 may execute an application related to the coupon when a user input for the message P1301 for confirming whether to store the notification information is received and a storage command is input. For example, the application related to the coupon may be at least one of a calendar application and a gallery application. Meanwhile, the processor 110 may not display the message P1301 for confirming the user's scheduling intention and may generate a screenshot image and execute the application related to the coupon at the same time.

Meanwhile, when a command to store the notification information is input, the processor 110 may display a message P1302 indicating that the screenshot image of the coupon and the notification information related to the coupon are stored in the memory 120 through the touch screen 151. For example, on the touch screen 151 of the mobile terminal 300, a guidance message P1302 including at least one of a product name, an place for exchange, or an valid term may be displayed along with a phrase 'the coupon below has been registered.' The guidance message P1302 may include a touch icon for checking the notification information related to a previously stored coupon. The touch icon may include an image or text (e.g., a coupon list). When a touch input for the touch icon is applied, the processor 110 may display notification information related to the previously stored coupon by executing the gallery application or the calendar application for displaying the notification information.

Figure 14:
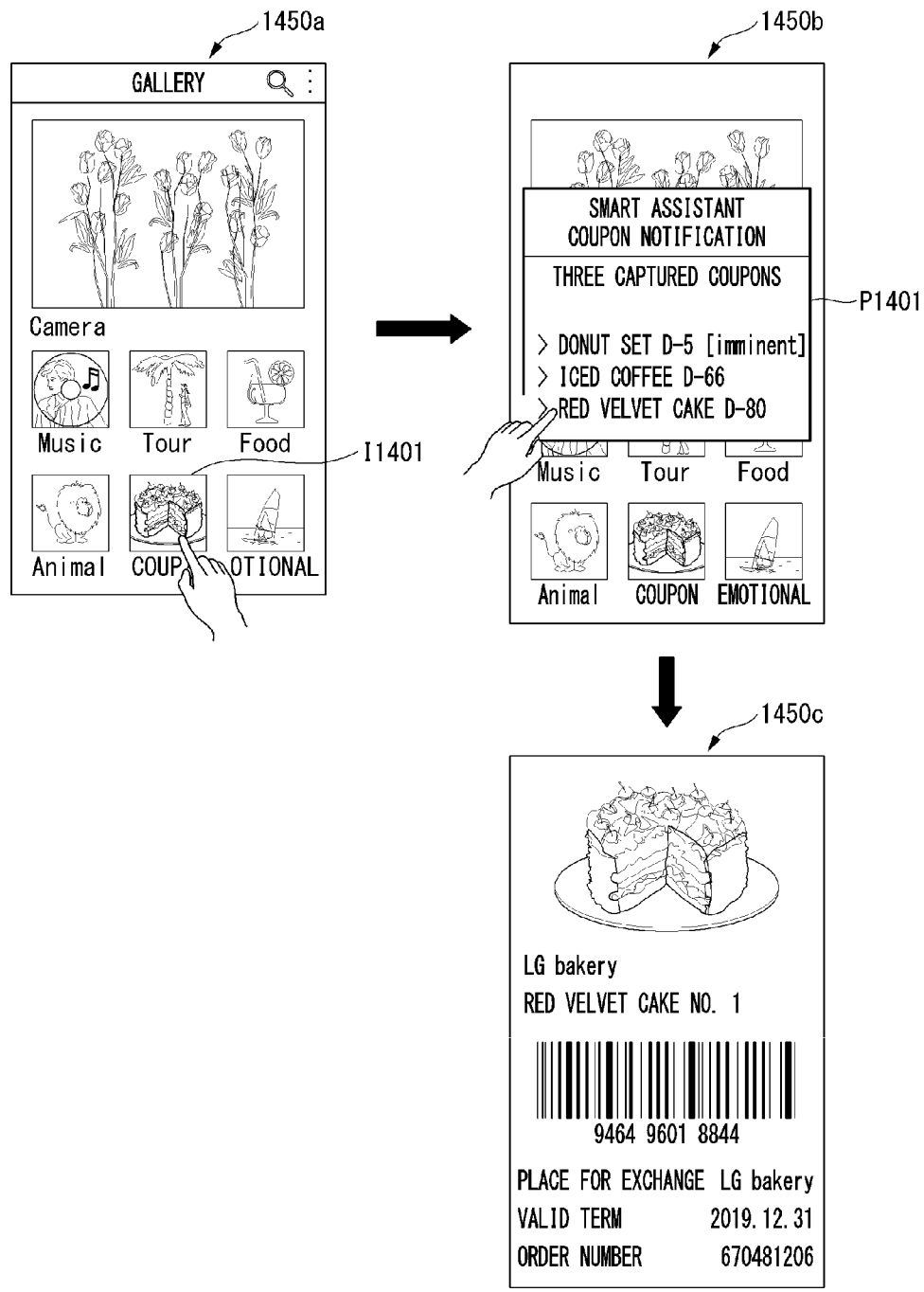
FIGS. 14 to 16 are implementation examples of a method for displaying a notification regarding a coupon.
Figure 15:
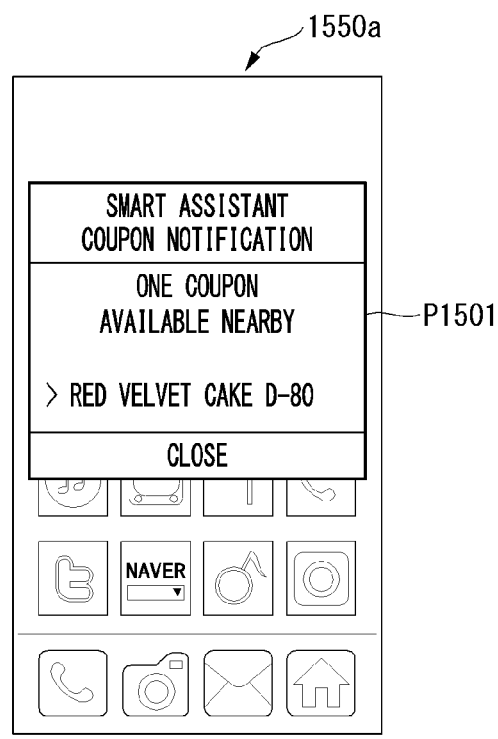
Figure 16:
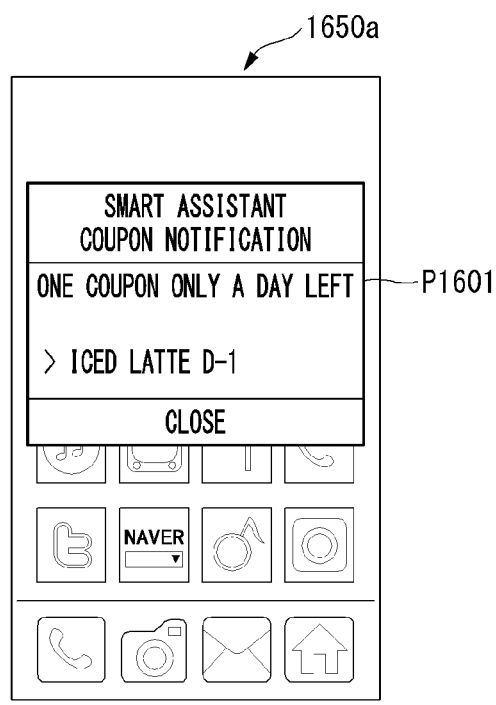

FIGS. 14 to 16 are implementation examples of a method for displaying a notification regarding a coupon.

FIG. 14 illustrates an example of outputting notification information related to a coupon in connection with a gallery application, and FIG. 15 illustrates an example of outputting notification information related to a coupon based on location information of the mobile terminal 300, and FIG. 16 shows an example of outputting notification information related to a coupon based on date information of the mobile terminal 300.

Referring to FIG. 14, the processor 110 outputs notification information related to a coupon using the gallery application and/or at least one recording folder constituting the gallery application. For example, when the gallery application is executed, the processor 110 may output notification information related to the coupon in response to the execution of the gallery application. As another example, the processor 110 may set any one of at least one recording folder constituting the gallery application as a folder storing notification information related to a coupon. When a touch input is applied to the folder storing notification information related to the coupon, the processor 110 may output notification information related to the coupon stored in the folder before displaying one or two or more images stored in the folder in response to the touch input.

In an embodiment, a message P1401 displaying notification information related to a coupon may include the number of notification information and/or a summary of the notification information. The summary of the notification information may include a product name and/or the number of days remaining until an expiration date of the validity term of the coupon.

When a user's touch input is applied to the summary of at least one notification information included in the message P1401 representing notification information related to the coupon, the processor 110 may receive the coupon corresponding to the selected summary from the memory 120 and display the same through the display or transmit the coupling to another terminal through the transceiver in response to the touch input.

Referring to FIG. 15, the mobile terminal 300 may generate location information of the mobile terminal 300 through GPS.

The processor 110 compares the location information of the mobile terminal 300 and the location information of a place of usage included in the notification information, and if a distance between the mobile terminal 300 and the place of usage decreases to below a reference distance, the processor 110 may display message P1501 including notification information through the display.

For example, the mobile terminal 300 may display a message P1501 including the number of notification information related to location information, such as 'There is 1 coupon available in the vicinity' and a valid term such as 'Red Velvet Cake D-80' through the touch screen 151.

Referring to FIG. 16, the mobile terminal 300 may receive date information from an external server capable of communicating through a network or may generate date information through internal processing. The processor 110 may compare the current date and the validity term of the coupon based on the date information, and a set date difference decreases to below a preset number of days, the processor 110 may display a message P1601 through the touch screen 151. For example, if the preset number of days is one day, the processor 110 may display the message P1601 by querying alarm information for which the validity term remains one day.

Figure 17:
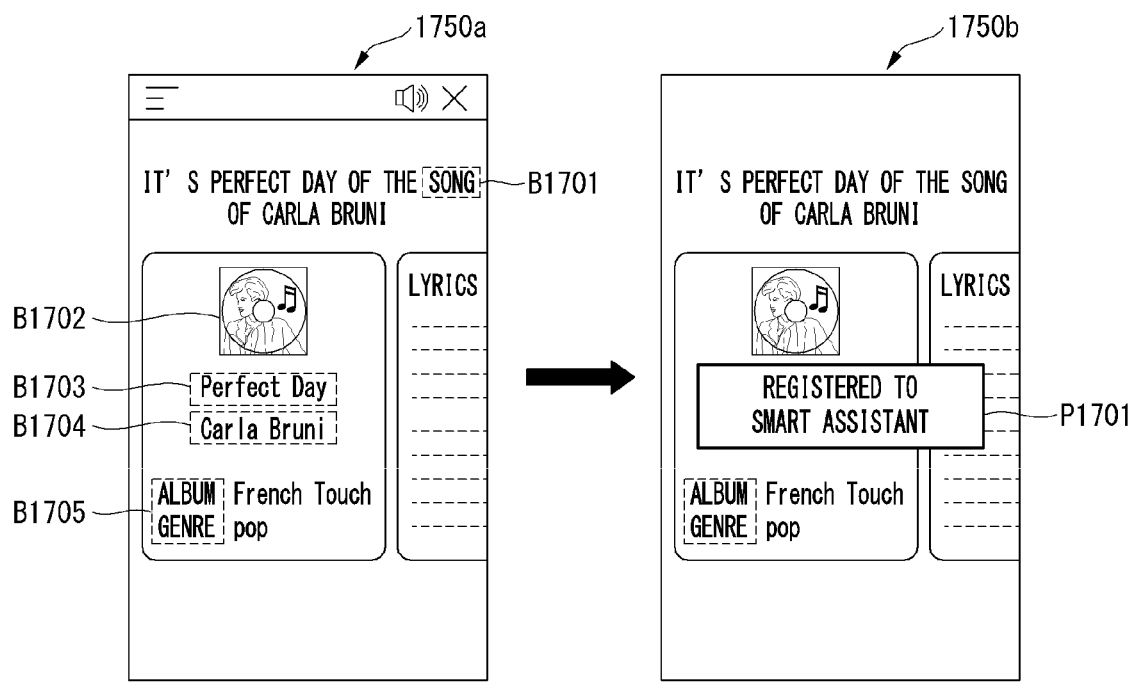
FIG. 17 is an implementation example of a method for generating a notification regarding sound source information.

FIG. 17 is an implementation example of a method for generating a notification regarding sound source information.

Referring to FIG. 17, the mobile terminal 300 outputs at least one text or image related to sound source information through the touch screen 151. The display screen displayed through the touch screen 151 includes a representative image of the sound source information and various texts related to the sound source information (e.g., a title of the sound source, a name of a singer, album, genre, etc.).

The processor 110 may determine a category of an image based on the text or the image included in the screenshot image. In the case of the sound source information shown in FIG. 17, the processor 110 may detect 'guidance message B1701', 'representative image B1702', 'title of song B1703', or 'album or genre B1705' and determine the category of the screenshot image as 'sound source information' using the detected information and previously learned learning model.

The processor 110 may extract a preset text or image corresponding to the 'sound source information' for which the category of the screenshot image is determined. For example, the processor 110 may extract the representative image B1701, the title of song B1703, or the singer B1704 from the screenshot image. The processor 110 may generate notification information using the extracted data.

When the notification information is generated, the processor 110 may display a message P1701 notifying the generation of the notification information through the touch screen 151. While the message is displayed, chroma of the display screen being displayed through the touch screen 151 may be adjusted.

Figure 18:
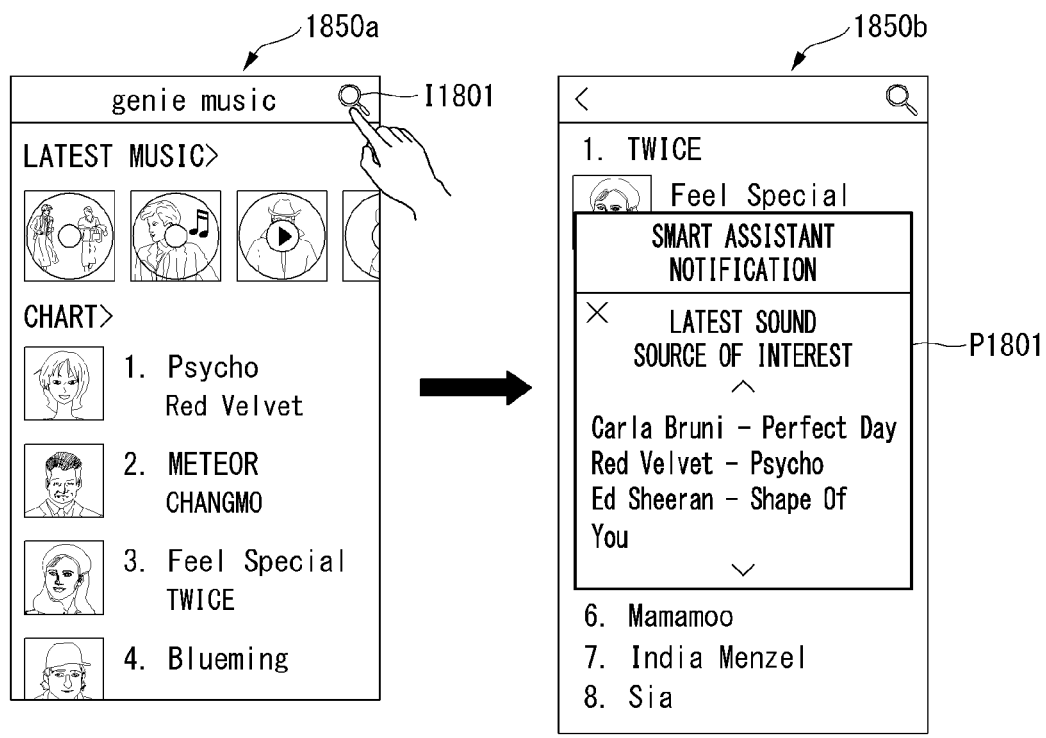
FIGS. 18 and 19 are implementation examples of a method for displaying a notification regarding sound source information.
Figure 19:
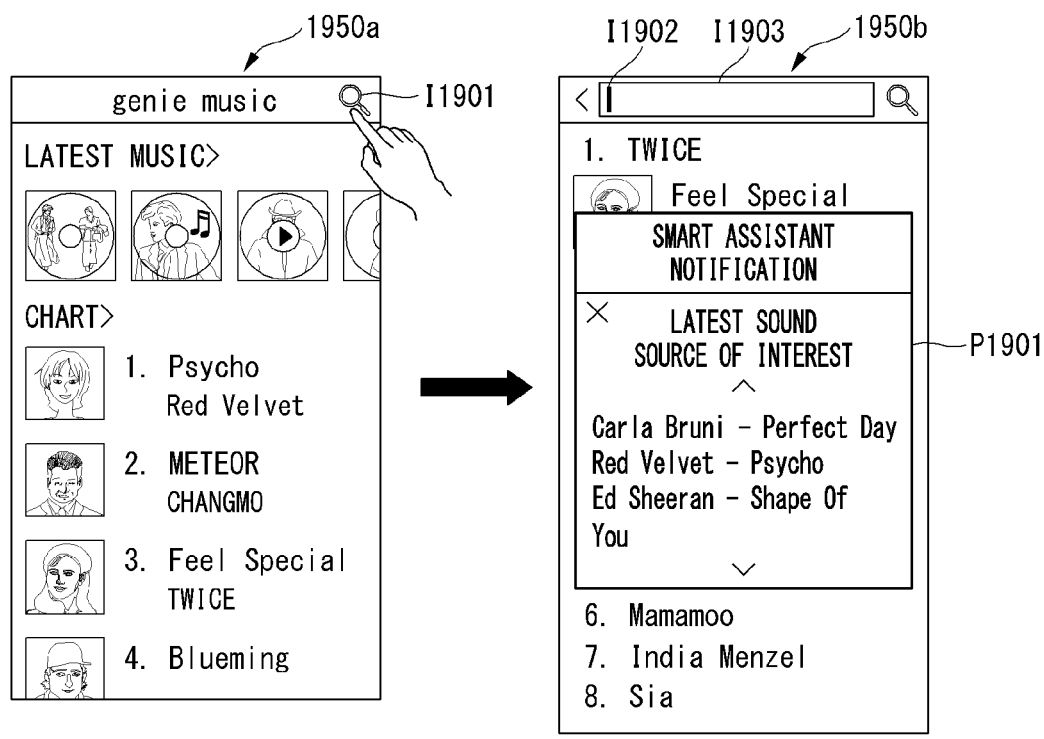

FIGS. 18 and 19 are implementation examples of a method for displaying a notification regarding sound source information.

Referring to FIG. 18, when a touch input is applied to an icon for searching a sound source, while a music application of the mobile terminal 300 is being executed, the processor 110 may display a message P1801 related to sound source information. The message related to the sound source information may include at least some of previously generated sound source information. For example, the message P1801 related to the sound source information may include a title of song and/or a singer among the sound source information, but is not limited thereto.

Referring to FIG. 19, when a touch input is applied to an icon for searching a sound source, while the music application of the mobile terminal 300 is being executed, the processor 110 activates a text editing bar for searching a sound source. When the text editing bar is activated, the processor 110 may display a message P1901 related to sound source information in response to the activation.

Figure 20:
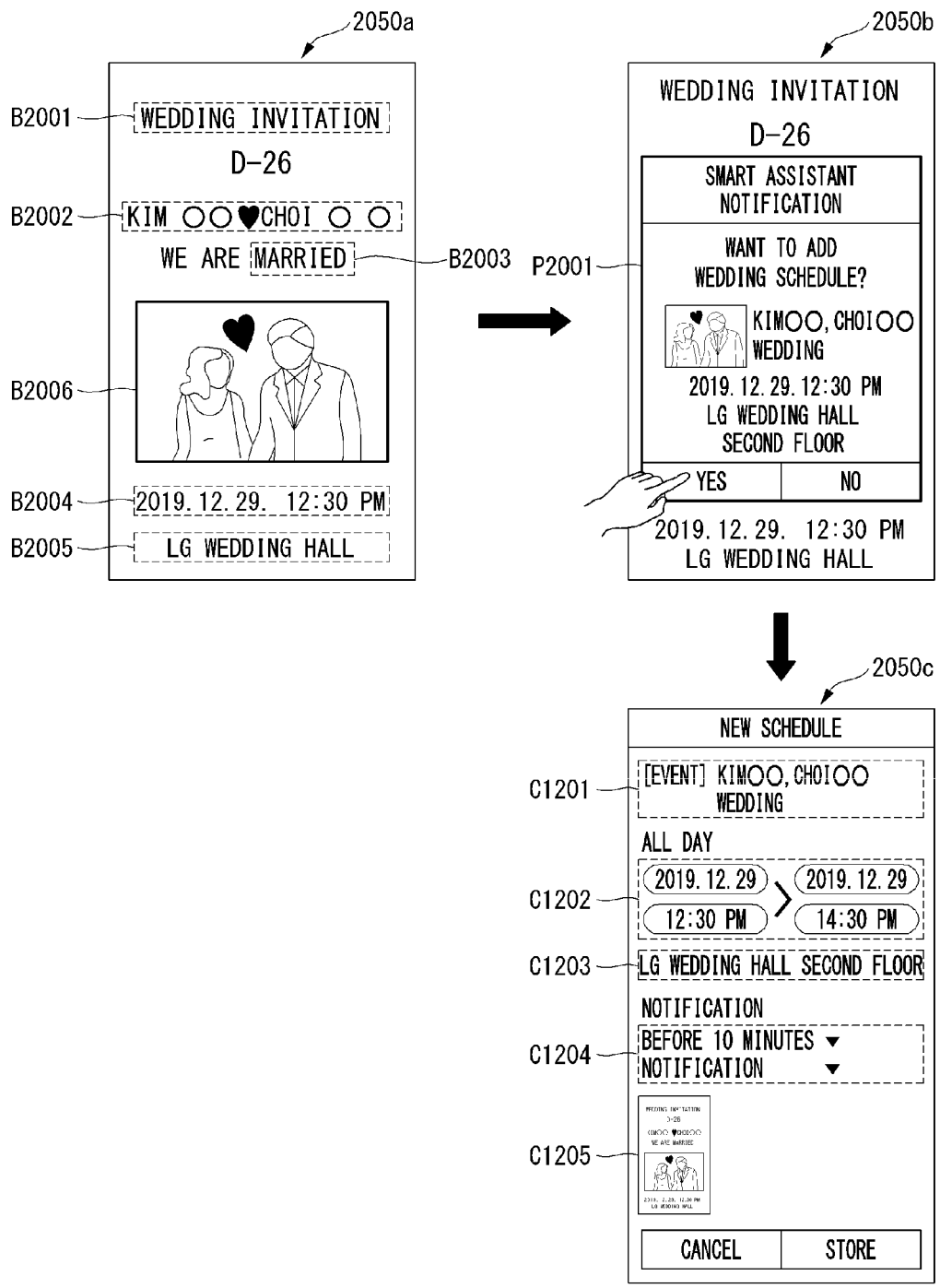
FIG. 20 is an implementation example of a method for generating a notification regarding an invitation card.

FIG. 20 shows an implementation example of a method for generating a notification regarding an invitation card.

Referring to FIG. 20, the mobile terminal 300 outputs at least one text or image related to an invitation card through the touch screen 151. The display screen displayed through the touch screen 151 includes a representative image of the invitation card and various texts related to the invitation card (e.g., 'invitation', type of event, event location, event time, etc.).

The processor 110 may determine a category of an image based on the text or the image included in the screenshot image. In the case of the invitation card shown in FIG. 20, the processor 110 may detect WEDDING INVITATION B2001', 'name of people B2002', 'type of event B2003', 'event date B2004', or 'event location B2005' and determine the category of the screenshot image as 'invitation card' using the detected information and a previously learned learning model.

The processor 110 may extract a preset text or image corresponding to the 'invitation card' for which the category of the screenshot image is determined. For example, the processor 110 may extract at least one of 'name of people B2002', 'type of event B2003', 'event date B2004', 'event location B2005', or 'representative image'B2006' from the screenshot image.

The processor 110 may display a message for confirming whether to store the notification information using the extracted data on the display screen in an overlapping manner.

The processor 110 may execute an application related to the invitation card when a user input for the message for confirming whether to store the notification information is received and a storage command is input. For example, the application related to an invitation card may be a calendar application.

Meanwhile, the processor 110 may generate the screenshot image and execute the application related to an invitation card at the same time, without displaying the message for confirming the user's scheduling intention.

When the calendar application is executed, the processor 110 may reflect the extracted data to correspond to each item of the calendar application. For example, the name of people B2002 and the type of event B2003 may be input to a title C1201 of a schedule in the calendar application, the event date B2004 may be input to a performance date C1202, and at least one of the name of people B2002, type of event B2003, event date B2004, event location B2005, or representative image B2006 may be input to schedule contents C1205, but is not limited thereto. Meanwhile, a notification timing C1204 may be set based on a response pattern regarding the notification of the user of the schedule application or may be set according to a preset value.

Thereafter, when a user's storage command is input, the processor 110 may store the notification information in the memory 120 using the calendar application or control the transceiver to transmit the notification information to an external terminal capable of communicating with the mobile terminal 300 through a network.

Figure 21:
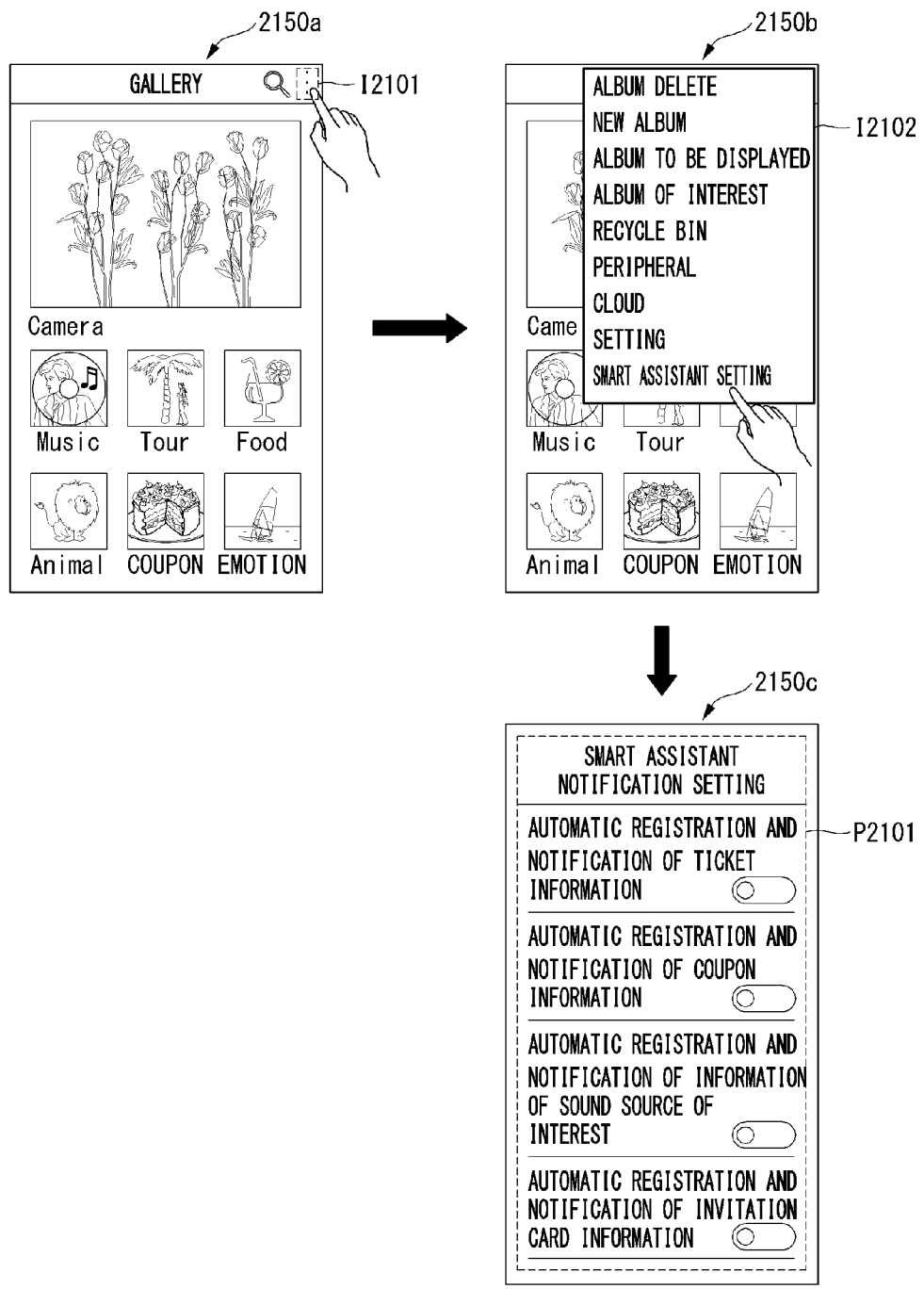
FIG. 21 is an implementation example of a method for controlling a setting related to implementation of a notification management method of the present disclosure.

FIG. 21 is an implementation example of a method for controlling a setting related to implementation of a notification management method of the present disclosure.

Referring to FIG. 21, the mobile terminal 300 may set a consent related to generation and/or display of notification information. For example, the consent related to generation and/or display of notification information may include at least one of 'automatic registration and notification of ticket information', 'automatic registration and notification of coupon information', 'automatic registration and notification of information of sound source of interest', or 'automatic registration and notification of invitation card information. When a user's consent input for the consent is received, the mobile terminal 300 may perform a process of generating notification information using the screenshot image based on the consent.

The consent related to the generation and/or display of notification information may be performed in at least one application related to the notification information. For example, referring to FIG. 21, the gallery application may include an icon 12101 for controlling a setting of the gallery application. When a user input is applied to the icon 12101 for controlling the setting of the application, the processor 110 may display a list 12102 representing a plurality of operations of the application in response to the application. In the case of the gallery application, for example, at least one of album delete, new album, album to be displayed, setting of album of interest, view locked file, recycle bin, peripheral device, cloud, setting, or smart assistant setting may be included in a list 12102 and displayed through the touch screen 151. When a user's touch input for smart assistant setting is applied, the mobile terminal 300 may display a screen P2101 indicating the smart assistant notification setting through the touch screen 151 in response to the touch input. Meanwhile, the smart assistant notification setting is merely an exemplary name and corresponds to any one of setting information for generating and/or displaying the notification setting.

Figure 22:
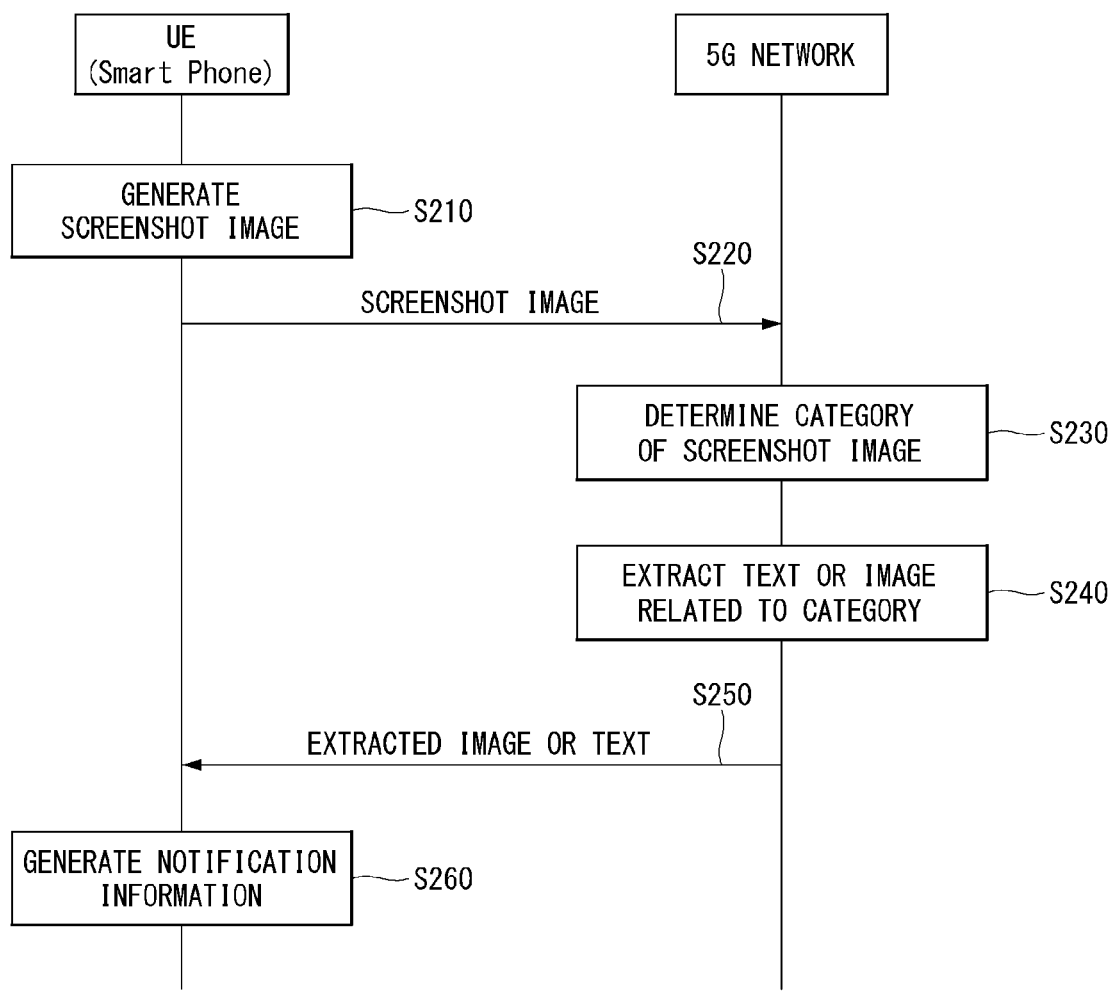
FIG. 22 is a sequence diagram of a notification management method according to another embodiment of the present disclosure.

FIG. 22 is a sequence diagram of a notification management method according to another embodiment of the present disclosure. Meanwhile, contents that overlaps the contents described above with reference to FIG. 11, among at least one step of FIG. 22, is omitted.

Referring to FIG. 22, a user equipment (UE) may control a transceiver to transmit a screenshot image or a feature extracted from the screenshot image to an AI system 1 included in a 5G network. In addition, the mobile terminal UE may control the transceiver to receive AI-processed information from the AI system 1.

Meanwhile, the UE may perform an initial access procedure with the 5G network in order to transmit the screenshot image to the 5G network. The UE may perform the initial access procedure with the 5G network based on a synchronization signal block (SSB).

In addition, the UE may receive, from the network, downlink control information (DCI) used to schedule transmission of the screenshot image through the transceiver.

The UE may transmit the screenshot image or the feature value extracted from the screenshot image to the 5G network based on the DCI.

The screenshot image or the feature value extracted from the screenshot image may be transmitted to the 5G network via a physical uplink shared channel (PUSCH), and the SSB and a DM-RS of the PUSCH may be quasi-co-located (QCL) for a QCL type D.

Referring back to FIG. 22, the UE may generate a screenshot image (S210). The UE may transmit the generated screenshot image to the network (S220). The AI system 1 may determine a category of the screenshot image (S230). The AI system 1 may extract text or an image related to the category (S240). The network may transmit the extracted image or text to the UE (S250). The UE may generate notification information (S260). Compared with FIG. 11, step S210 of the notification management method of FIG. 22, S210 corresponds to S110, S230 corresponds to S120, S240 corresponds to S130, and S260 corresponds to S140.

Effects of image context processing according to an embodiment of the present disclosure will be described as follows.

In the present disclosure, the type of information indicated by a screenshot image may be identified by analyzing context of the screenshot image on a display screen.

In addition, in the present disclosure, an image or text included in the screenshot image in association with an application corresponding to the type of information represented by the identified screenshot image by analyzing the context of the screenshot image may be stored.

In addition, in the present disclosure, a guidance message may be transferred to output based on time information or location information of the stored image or text.

The effects which may be obtained by the present invention are not limited to the aforementioned effects, and other technical effects not described above may be evidently understood by a person having ordinary skill in the art to which the present invention pertains from the following description.

The above-described present disclosure can be implemented as a computer-readable code on a medium on which a program is recorded. The computer readable medium includes all kinds of recording devices in which data that can be read by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like, or be implemented in the form of a carrier wave (e.g., transmission over the internet). Accordingly, the above detailed description should not be construed in all aspects as limiting, and be considered illustrative. The scope of the present disclosure should be determined by rational interpretation of the appended claims, and all changes within the equivalent range of the present disclosure are included in the scope of the present disclosure.

What is claimed is:

1. A notification management method of a mobile terminal, the notification management method comprising:

generating a screenshot image;
determining a category of the screenshot image based on a text or an image included in the screenshot image;
extracting the text or the image related to the category and generating notification information using the extracted text or image;
displaying a first message for confirming whether to store the notification information; and
executing an application related to the category when a user input for the first message is received,
wherein after extracting of the text or the image related to the category is performed, selectively displaying a second message through a touch screen of the mobile terminal that is displaying the screenshot image to overlap the screenshot image, the second message including the extracted text or image for generating the notification information,
wherein the category includes a performance ticket, a coupon or an invitation card, and
wherein the application related to the category is a calendar.

2. The method of claim 1, wherein, in the generating of the screenshot image, the screenshot image is generated from an image being displayed through the touch screen in response to a user input.

3. The method of claim 1, wherein in the generating of the screenshot image, an image of a display screen displayed in a terminal able to communicate with the mobile terminal is received in response to a user input.

4. The method of claim 1, wherein the determining of the category comprises:
extracting features from the text or the image included in the screenshot image; and
determining the category of the screenshot image using the extracted features and a learning model.

5. The method of claim 1, wherein when the category is the performance ticket, data of the extracted text or image includes a keyword, a schedule, a location, a ticket number, or a reservation number related to the performance ticket, or a representative image of the performance.

6. The method of claim 1, wherein when the category is the coupon, data of the extracted text or image includes a keyword, a barcode, coupon contents, a valid term, or a place of usage related to the coupon.

7. The method of claim 1, wherein when the category is the invitation card, data of the extracted text or image includes a keyword, event contents, a schedule, a location, or an invitation image related to the invitation card.

8. The method of claim 1, wherein the generating of the notification information comprises:
displaying a third message for generating the notification information; and
generating the notification information when a user input for the third message is received.

9. The method of claim 1, wherein the notification information includes the text or the image related to the category.

10. The method of claim 1, further comprising:
receiving, from a network, downlink control information (DCI) used for scheduling transmission of the screenshot image; and
transmitting, to the network, the screenshot image based on the DCI.

11. The method of claim 10, further comprising:
performing an initial access procedure with the network based on a synchronization signal block (SSB); and
transmitting the screenshot image to the network via a physical uplink shared channel (PUSCH),
wherein the SSB and a demodulation reference signal (DM-RS) of the PUSCH are quasi-co-located (QCL) for a QCL type D.

12. The method of claim 11, further comprising:
controlling a transceiver to transmit the screenshot image to an artificial intelligence (AI) processor included in the network; and
controlling the transceiver to receive AI-processed information from the AI processor,
wherein the AI-processed information is an output of the category of the screenshot image or a learning model representing the category.

13. The method of claim 1, wherein the notification information is generated upon a user input of acceptance of the displayed message.

14. The method of claim 1, wherein the message is displayed together with a preview of the notification information.

15. The method of claim 14, wherein the preview includes only some of the notification information.

16. The method of claim 1, wherein the notification information using the extracted text or image is immediately generated after extracting the text or the image related to the category without displaying the first message.

17. A user equipment comprising:
a memory configured to record a screenshot image; and
a processor configured to determine a category of the screenshot image based on a text or an image included in the screenshot image, extract the text or the image related to the category, generate notification information using the extracted text or image, display a first message for confirming whether to store the notification information, and execute an application related to the category when a user input for the first message is received,
wherein after the processor extracts the text or the image related to the category, a second message is selectively displayed through a touch screen of the user equipment that is displaying the screenshot image to overlap the screenshot image, the second message including the extracted text or image for generating the notification information,
wherein the category includes a performance ticket, a coupon or an invitation card, and
wherein the application related to the category is a calendar.

18. The user equipment of claim 17, wherein the touch screen is configured to display a screen, and
wherein the processor is configured to generate the screenshot image from an image being displayed through the touch screen in response to a user input.

19. The user equipment of claim 17, further comprising:
a transceiver able to communicate with an external terminal,
wherein the processor is configured to control the transceiver to receive an image of a display screen being displayed in the external terminal in response to a user input.

20. The user equipment of claim 17, wherein the processor is configured to extract features from the text or the image included in the screenshot image and to determine a category of the screenshot image using the extracted features and a learning model.

* * * * *